(12) United States Patent
Liston et al.

(10) Patent No.: US 9,545,796 B1
(45) Date of Patent: Jan. 17, 2017

(54) CORRECTION OF PERIODIC REGISTRATION ERRORS

(71) Applicant: Eastman Kodak Company, Rochester, NY (US)

(72) Inventors: Christopher B. Liston, Rochester, NY (US); Matthias H. Regelsberger, Rochester, NY (US); James A. Katerberg, Kettering, OH (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 15/089,783

(22) Filed: Apr. 4, 2016

(51) Int. Cl.
B41J 2/21 (2006.01)
B41J 2/165 (2006.01)

(52) U.S. Cl.
CPC .................. B41J 2/2135 (2013.01)

(58) Field of Classification Search
CPC .......... B41J 2/2132; B41J 2/2135; B41J 2/21; B41J 2/165; G03G 2215/0161; B41P 2233/52; H04N 1/50
See application file for complete search history.

(56) References Cited

U.S. PATENT DOCUMENTS

| | | | |
|---|---|---|---|
| 6,421,522 B2 | 7/2002 | Henderson et al. | |
| 8,238,805 B2 * | 8/2012 | Kang | G03G 15/0194 399/301 |
| 8,755,080 B2 | 6/2014 | Wozniak et al. | |
| 8,760,712 B2 | 6/2014 | Enge et al. | |
| 8,845,059 B2 | 9/2014 | Enge et al. | |
| 9,010,900 B1 | 4/2015 | Armbruster et al. | |
| 9,016,822 B1 | 4/2015 | Armbruster et al. | |
| 9,016,823 B1 | 4/2015 | Armbruster et al. | |
| 9,016,824 B1 | 4/2015 | Armbruster et al. | |
| 9,033,445 B1 | 5/2015 | Armbruster et al. | |
| 9,094,643 B2 | 7/2015 | Armbruster et al. | |
| 9,120,634 B1 | 9/2015 | Muir et al. | |
| 9,162,475 B1 | 10/2015 | Wozniak et al. | |
| 9,213,287 B1 | 12/2015 | Armbruster et al. | |
| 2013/0113857 A1 | 5/2013 | Armbruster et al. | |
| 2015/0116734 A1 | 4/2015 | Howard et al. | |
| 2015/0125188 A1 * | 5/2015 | Cho | G03G 15/5058 399/301 |

\* cited by examiner

Primary Examiner — Thinh H Nguyen
(74) Attorney, Agent, or Firm — Kevin E. Spaulding

(57) ABSTRACT

Color registration errors are corrected for print jobs including periodic image content. A first subset of document pages are printed and the resulting color registration errors are measured. The measured color registration errors are analyzed to identify the presence of a periodic pattern of color registration errors having a repeat period. A repeating pattern of color registration correction values are determined corresponding to the periodic pattern of color registration errors. A second subset of the document pages is printed using the determined repeating pattern of color registration correction values.

12 Claims, 15 Drawing Sheets

CORRECTION OF PERIODIC REGISTRATION ERRORS

CROSS REFERENCE TO RELATED APPLICATIONS

Reference is made to commonly assigned, co-pending U.S. patent application Ser. No. 15/089,795, filed Apr. 4, 2016, entitled REGISTRATION CORRECTION FOR PERIODIC INK COVERAGE PATTERNS, by Liston et al., which is incorporated herein by reference.

FIELD OF THE INVENTION

The present invention relates to digital printing systems and more particularly to correcting periodic patterns of color-to-color registration errors.

BACKGROUND OF THE INVENTION

In a digitally controlled printing system, a print medium is directed through a series of components. The print medium can be in the form of cut sheets or a continuous web. As the print medium moves through the printing system, colorant, for example, ink, is applied to the print medium by one or more printing stations. In the case of an inkjet printer, the colorant is a liquid ink, and the printing process is commonly referred to as jetting of the ink.

In commercial inkjet printing systems, the print medium is physically transported through the printing system at a high rate of speed. For example, the print medium can travel 650 to 1000 feet per minute. Inkjet lineheads in commercial inkjet printing systems typically include multiple printheads that jet ink onto the print medium as the print medium is being physically moved through the printing system. A reservoir containing ink or some other material is usually behind each nozzle plate in a linehead. The ink streams through the nozzles in the nozzle plates when the reservoirs are pressurized.

The printheads in each linehead in commercial printing systems typically jet only one color. Thus, there is a linehead for each colored ink when different colored inks are used to print content. For example, there are four lineheads in printing systems using cyan, magenta, yellow, and black colored inks. The content is printed by jetting the colored inks sequentially, and each colored ink deposited on the print medium is known as a color plane. The color planes need to be aligned (i.e., "registered" with each other) so that the overlapping ink colors produce a quality single image.

Color registration errors can be classified into different types. Examples of color registration errors include, but are not limited to, a color plane having a linear translation with respect to another color plane, a color plane being rotated with respect to another color plane, and a color plane being stretched, contracted, or both stretched and contracted in different regions or in different directions with respect to another color plane.

There are several variables that contribute to the registration errors in color plane alignment including physical properties of the print medium, conveyance of print medium, ink application system, ink coverage, and drying of ink. Color registration errors are typically managed by controlling these variables. However, controlling these variables can often restrict the range of desired print applications. For example, color-to-color registration errors will typically become larger as paper weight for the print application is reduced, when ink coverage is increased, or when the amount of ink coverage is more variable for successive documents. These limitations compromise the range of suitable applications for inkjet printing systems.

As discussed in U.S. Pat. No. 9,094,643 (Armbruster et al.), entitled "Color-to-color correction in a printing system," when a print job consists of printing multiple copies of a repeated sequence of pages, such as multiple copies of a multi-page document such as book, the registration errors are quite consistent from one cycle of the sequence of pages to the next cycle. Recognizing the consistency of the registration errors, Armbruster et al. disclosed a method for improving the color plane registration by compensating for such cyclically repeating registration errors. The method included measuring the registration errors for each page in a first copy of the sequence of pages, and determining registration correction values associated with each of the pages. While printing subsequent copies of the multi-page document, the registration of each page is corrected using the determined registration correction values associated with that page. This method was found to be quite effective at reducing the registration errors. However, it requires that the print engine know the number of pages in a document before it starts printing. In some job submission methods, such as Intelligent Printer Data Stream (IPDS) or Inkjet Printing Data Stream (IJPDS), the number of pages in the document is not provided in the data stream. There remains a need for improved registration correction methods to correct print jobs including a plurality of multi-page documents where the number of pages in each document is not known.

SUMMARY OF THE INVENTION

The present invention represents a method for correcting color registration errors while printing a print job on a print media using a color printer, the print job including a plurality of document pages having pixel values for a plurality of color planes, including:

using the color printer to print a first subset of the document pages using the color printer;

measuring color registration errors for the printed first subset of document pages;

analyzing the measured color registration errors to determine a periodic pattern of color registration errors having a repeat period;

determining a repeating pattern of color registration correction values corresponding to the periodic pattern of color registration errors, wherein the color registration correction values specify image plane corrections for at least one of the color planes; and using the color printer to print a second subset of the document pages using the determined repeating pattern of color registration correction values.

This invention has the advantage that periodic registration errors in a print job can be detected and corrected without any a priori knowledge about the periodicity of the document pages in the print job.

It has the additional advantage that the periodic pattern of color registration corrections are updated in response to detecting changes in the periodic pattern of color registration errors.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
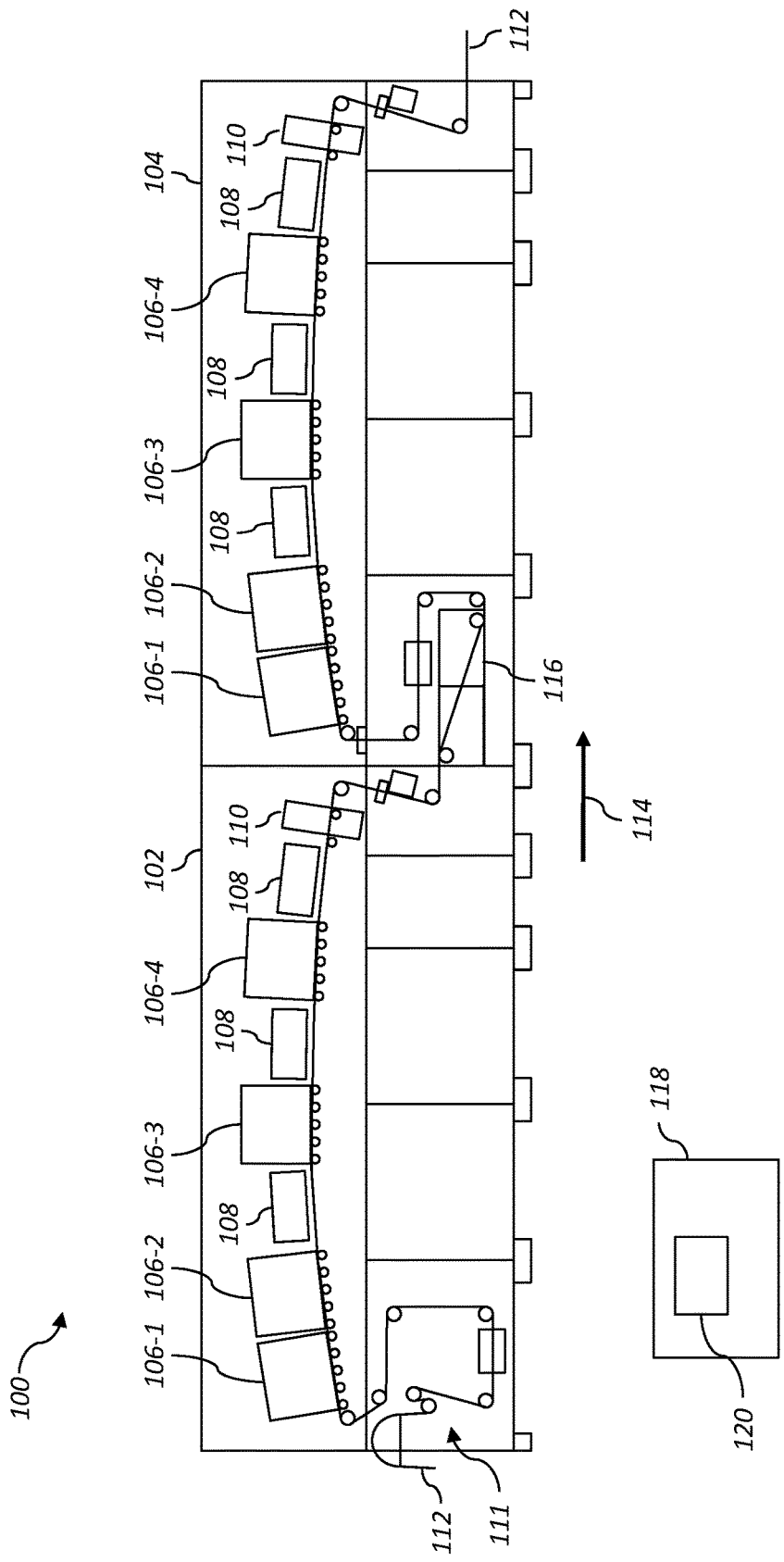
FIG. 1 is a schematic of a continuous-web inkjet printing system.

The present description will be directed in particular to elements forming part of, or cooperating more directly with, apparatus in accordance with the present invention. It is to be understood that elements not specifically shown or described may take various forms well known to those skilled in the art.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Where they are used, terms such as "first", "second", and so on, do not necessarily denote any ordinal or priority relation, but are simply used to more clearly distinguish one element from another.

The present invention is well-suited for use in roll-fed inkjet printing systems that apply colorant (e.g., ink) to a web of continuously moving print media. In such systems a printhead selectively moistens at least some portion of the media as it moves through the printing system, but without the need to make contact with the print media. While the present invention will be described within the context of a roll-fed inkjet printing system, it will be obvious to one skilled in the art that it could also be used for other types of printing systems as well.

In the context of the present invention, the terms "web media" or "continuous web of media" are interchangeable and relate to a media that is in the form of a continuous strip of media as it passes through the web media transport system from an entrance to an exit thereof. The continuous web media serves as the receiver medium (e.g., print media) to which one or more colorants (e.g., inks or toners), or other coating liquids are applied. This is distinguished from various types of "continuous webs" or "belts" that are transport system components (as compared to the image receiving media) which are typically used to transport a cut sheet medium in an electrophotographic or other printing system.

The example aspects of the present invention are illustrated schematically and not necessarily to scale for the sake of clarity. One of ordinary skill in the art will be able to readily determine the specific size and interconnections of the elements of the example aspects of the present invention.

As described herein, exemplary aspects of the present invention are applied to color plane registration in inkjet printing systems. The example aspects of the present invention are also applied to the registration or stitching of print swaths of the individual printheads that are aligned relative to each other in a linehead. For simplicity, the term registration shall be applied both the registration of print swaths printed by the printheads within a linehead and to the registration of color planes printed by different lineheads.

Inkjet printing is commonly used for printing on paper. However, printing can occur on any substrate or receiving medium. For example, vinyl sheets, plastic sheets, glass plates, textiles, paperboard, and corrugated cardboard can comprise the print medium. In addition to conventional inkjet printing, many applications are emerging which use inkjet printheads or similar nozzle arrays to emit fluids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. In addition, a nozzle array can jet out gaseous material or other fluids. As such, as described herein, the terms "liquid", "ink" and "inkjet" refer to any material that is ejected by a nozzle array. While the invention will be described in terms of a multi-color printer, it should be understood that the invention similarly applies to other applications such as the printing of multiple layers of an electronic circuit where the individual circuit layers would correspond to an image plane in the color printer. In such applications, registration of the individual electrically conductive or electrically insulating layers must be maintained for proper operation of the electronic circuit in a similar manner to the registration of the color image planes in the color prints. It is anticipated that many other applications may be developed in which the invention may be employed to enhance the registration of the image planes.

Inkjet printing is a non-contact application of an ink to a print medium. Typically, one of two types of inkjetting mechanisms are used and are categorized by technology as either "drop on demand" inkjet or "continuous inkjet". The first technology, drop-on-demand inkjet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal inkjet."

The second technology, commonly referred to as continuous inkjet printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting drops so that print drops reach the print medium and non-print drops are caught by a collection mechanism. Various approaches for selectively deflecting drops have been developed including electrostatic deflection, air deflection, and thermal deflection.

Additionally, there are typically two types of print media used with inkjet printing systems. The first type is commonly referred to as a continuous web of print media, while the second type is commonly referred to as cut sheets of print media. The continuous web of print media refers to a continuous strip of print media, generally originating from a source roll. The continuous web of print media is moved relative to the inkjet printing system components via a web transport system, which typically includes drive rollers, web guide rollers, and web tension sensors. Cut sheets refer to individual sheets of print media that are moved relative to the inkjet printing system components via a support mechanism (e.g., rollers and drive wheels or a conveyor belt system) that is routed through the inkjet printing system.

The invention described herein is generally applicable to both types of printing technologies. As such, the terms linehead and printhead, as used herein, are intended to be generic and not specific to either technology. Additionally, the invention described herein is applicable to both types of print medium. As such, the terms print medium and web, as used herein, are intended to be generic and not as specific to one type of print medium or web or the way in which the print medium or web is moved through the printing system. Additionally, the terms linehead, printhead, print medium, and web can be applied to other nontraditional inkjet applications, such as printing electrical circuits on plastic sheets composed of electrically conductive and insulating layers.

The terms "color plane" and "image plane" are used generically and interchangeably herein to refer to a portion of the data that is used to specify the location of features that are made by a particular printing station of a digitally controlled printing system on the print medium. Similarly, "color-to-color registration" is used generically herein to refer to the registration of such features that are made by different printing stations on the print medium. For the color printing of images, the patterns of ink printed by different printheads in printing the same or different colors must be registered with each other to provide a high quality image. An example of a non-color printing application is functional printing of a circuit. The patterns of material printed by different printheads (i.e., the image planes), form directly or serve as catalysts or masks for the formation of different layers of deposited conductive materials, semiconductor materials, resistive materials, insulating materials of various dielectric constants, high permeability magnetic materials, or other types of materials, must also be registered to provide a properly functioning circuit. The terms color plane and color-to-color registration can also be used herein to refer to the mapping and registration of pre-print or finishing operations, such as the mapping of where the folds or cutting or slitting lines are, or the placement of vias in an electrical circuit.

The terms "upstream" and "downstream" are terms of art referring to relative positions along the transport path of the print medium; points on the transport path move from upstream to downstream. In FIGS. 1-6, a print medium 112 moves along a transport path from upstream to downstream in a transport direction 114.

The schematic side view of FIG. 1 shows one example of a continuous web inkjet printing system 100. Printing system 100 includes a first print module 102 and a second print module 104, each of which includes lineheads 106-1, 106-2, 106-3, 106-4, dryers 108, and a quality control sensor 110. Each linehead 106-1, 106-2, 106-3, and 106-4 typically includes multiple printheads (not shown) that apply ink or another fluid (gas or liquid) to the surface of the print medium 112 that is adjacent to the printheads. In the illustrated aspect, each linehead 106-1, 106-2, 106-3, and 106-4 applies a different colored ink to the surface of the print medium 112 that is adjacent to the lineheads 106-1, 106-2, 106-3, and 106-4. By way of example only, linehead 106-1 applies cyan colored ink, linehead 106-2 magenta colored ink, linehead 106-3 yellow colored ink, and linehead 106-4 black colored ink. The portion of the transport path in each print module 102, 104 from the first linehead 106-1 through the last linehead 106-4 is called a "print zone."

The printing system 100 also include a web tension system 111 (portions of which are shown in FIG. 1) that serves to move the print medium 112 through the printing system 100 in a controlled fashion along the transport path in the transport direction 114 (generally left-to-right as in FIG. 1). The print medium 112 enters the first print module 102 from a source roll (not shown) and the lineheads 106-1, 106-2, 106-3, 106-4 of the first print module 102 apply ink to one side of the print medium 112. As the print medium 112 feeds into the second print module 104, a turnover module 116 is adapted to invert or turn over the print medium 112 so that the lineheads 106-1, 106-2, 106-3, 106-4 of the second print module 104 can apply ink to the other side of the print medium 112. The print medium 112 then exits the second print module 104 and is collected by a print medium receiving unit (not shown).

A processing system 118 can be connected to various components in the web tension system 111 and used to control the positions of the components, such as gimbaled or caster rollers. Processing system 118 can also be connected to the quality control sensors 110 and used to process images or data received from the quality control sensors 110. The processing system 118 can also be connected to components in printing system 100 using any known wired or wireless communication connection. Processing system 118 can be separate from printing system 100 or integrated within printing system 100 or within a component in printing system 100. In various embodiments, the processing system 118 can include a single processor, or can include a plurality of processors. Each of the one or more processors can be separate from the printing system 100 or integrated within the printing system 100.

A storage system 120 is connected to the processing system 118. The storage system 120 can store color plane correction values in an aspect of the invention. The storage system 120 can include one or more external storage devices; one or more storage devices included within the processing system 118; or a combination thereof. In some embodiments, the storage system 120 can include its own processor, and can have memory accessible by the one or more processors in the processing system 118. As will be discussed in more detail later, in accordance with embodiments of the invention, the storage system 120 can be used to store data useful for determining appropriate registration corrections for documents in a print job or ink laydown information for documents in a print job.

Figure 2:
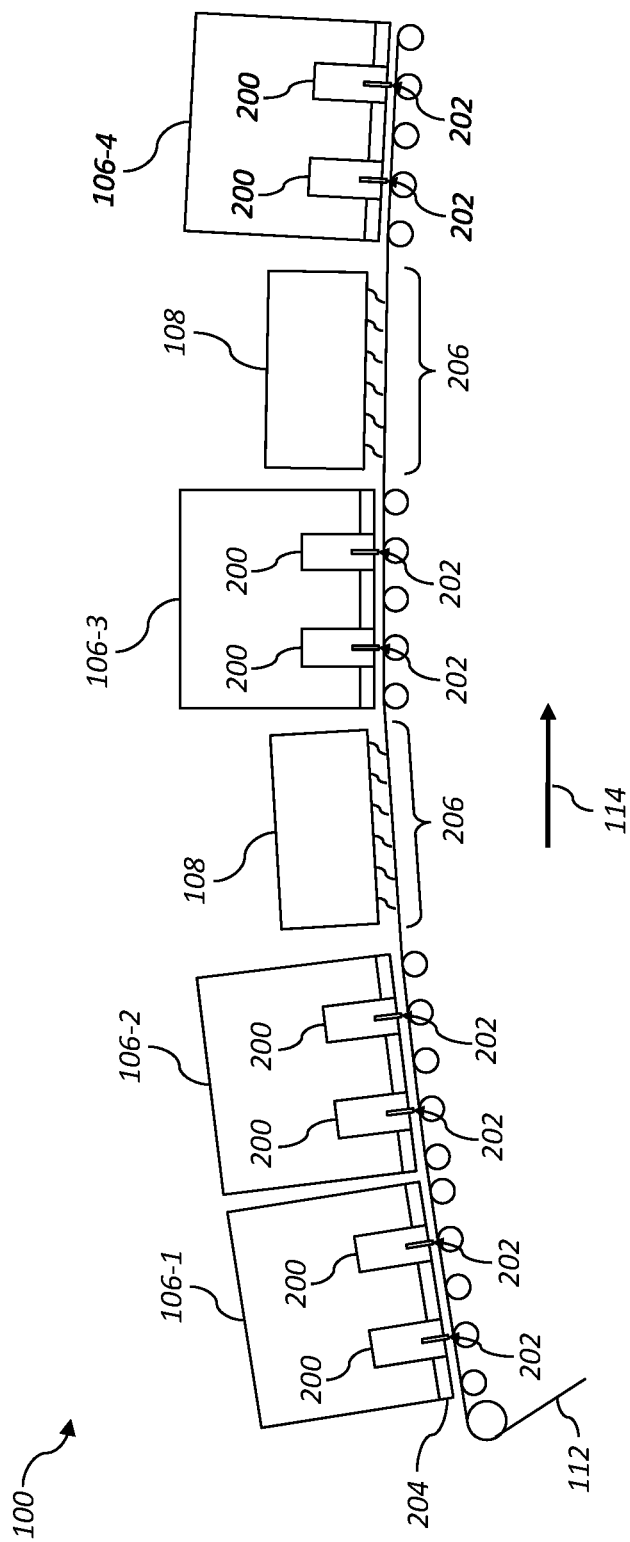
FIG. 2 is a schematic showing additional details for a portion of the printing system of FIG. 1.

FIG. 2 illustrates a portion of the printing system 100 in greater detail. As the print medium 112 is moved through printing system 100, the lineheads 106-1, 106-2, 106-3, 106-4, which typically include a plurality of individual printheads 200, apply ink or another fluid onto the print medium 112 via nozzle arrays 202 of the printheads 200. The printheads 200 within each linehead 106-1, 106-2, 106-3, and 106-4 are located and aligned by a support structure 204 in the illustrated aspect. After the ink is jetted onto the print medium 112, the print medium 112 passes beneath the one or more dryers 108 which apply heat 206 or air to the ink on the print medium 112 to remove at least a portion of the moisture. For example, inks typically include colorant particles in a carrier liquid. In this case, the dryer 108 is used to remove carrier liquid from the print medium 112.

Figure 3:
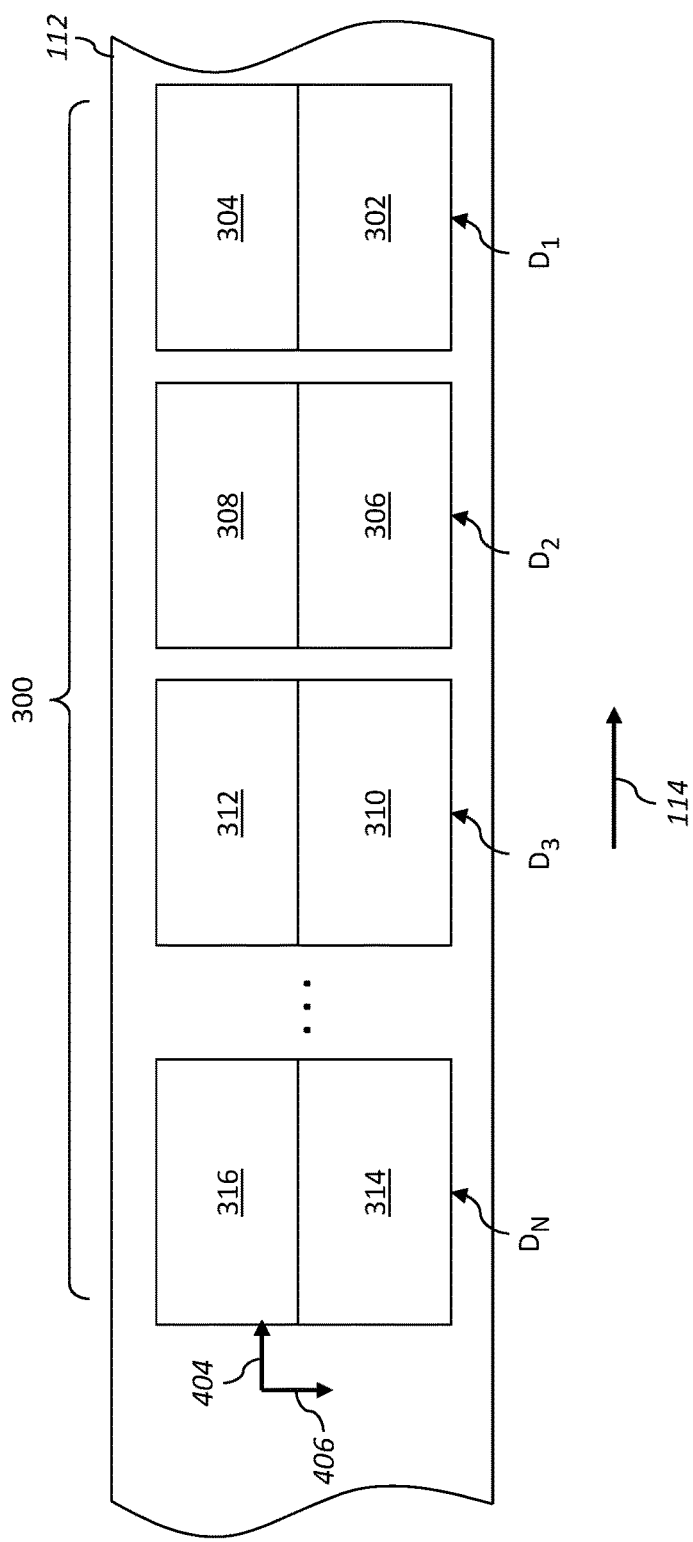
FIG. 3 illustrates a print job including a number of documents.

Referring now to FIG. 3, there is shown one example of a print job 300 including a number of document pages $D_1$, $D_2$, $D_3$ ... $D_N$ to be printed in sequence. As used herein, the term "print job" refers to a collection of documents to be printed in sequence. A "document" can include any printed output such as, for example, text, graphics, or photos, individually or in various combinations. The printed output can be disposed anywhere on the print medium 112, and the printed output in each document can differ from the printed content in the other documents in a print job 300. In some cases, the print job 300 can include a subset of the collection of documents that are printed multiple times with the documents in the subset being printed in the same sequential order each time the subset is printed, but is not limited to such repeated sequence of documents. A print job 300 comprising the printing of multiple copies of a book is an example of a print job 300 that includes a subset of the collection of documents that are printed multiple times with the documents in the subset being printed in the same sequential order each time the subset is printed. Each document can be made up of one or more pages of information across the width of the print medium 112, each document in FIG. 3 comprises two pages printed side by side. In this example, document page $D_1$ includes pages 302, 304, document page $D_2$ includes pages 306, 308, document page $D_3$ includes pages 310, 312, and document page $D_N$ includes pages 314, 316. Each document can include pages printed on both the front side of the print medium 112 and the back side of the print medium 112.

When the print job 300 is printed, the total amount of ink printed on the print medium 112 can vary significantly from document to document within the print job 300. Furthermore, the spatial distribution of the ink applied to the print medium 112 within the documents can vary significantly within each document. In turn, the aqueous component of the ink is absorbed into the print medium 112 and can cause the print medium 112 to swell and stretch, especially with water-based ink or in high ink laydown regions of the printed content (e.g., an image region with a dense black background). Stretch can be higher in the in-track direction 404 (i.e., the transport direction 114) than in the cross-track direction 406. Non-uniform swell or stretch of the print medium 112 across the width of the print medium 112 can cause the print medium 112 to drift laterally as it moves through the printing system. As the image content changes from document to document, different portions along the length of the print medium 112 can drift back and forth in the cross-track direction 406.

Additionally, drying of the print medium 112 can cause the print medium 112 to shrink. When the print medium 112 is heated in between lineheads 106-1, 106-2, 106-3, 106-4 (FIG. 1), regions of the print medium 112 can be stretched and shrunk one or more times as the print medium 112 moves through the printing system 100 (FIG. 1).

Printing with several color planes, in which each color record is printed sequentially, requires color laydown registration. Unanticipated or unaccounted for stretch or shrink in the print medium 112 can produce a loss of color registration and can lead to blurry content or hue degradation. Additionally, printing on both sides of the print medium 112 usually requires front-to-back registration, with the second side of the print medium 112 usually being printed significantly later than the first side.

Figure 4:
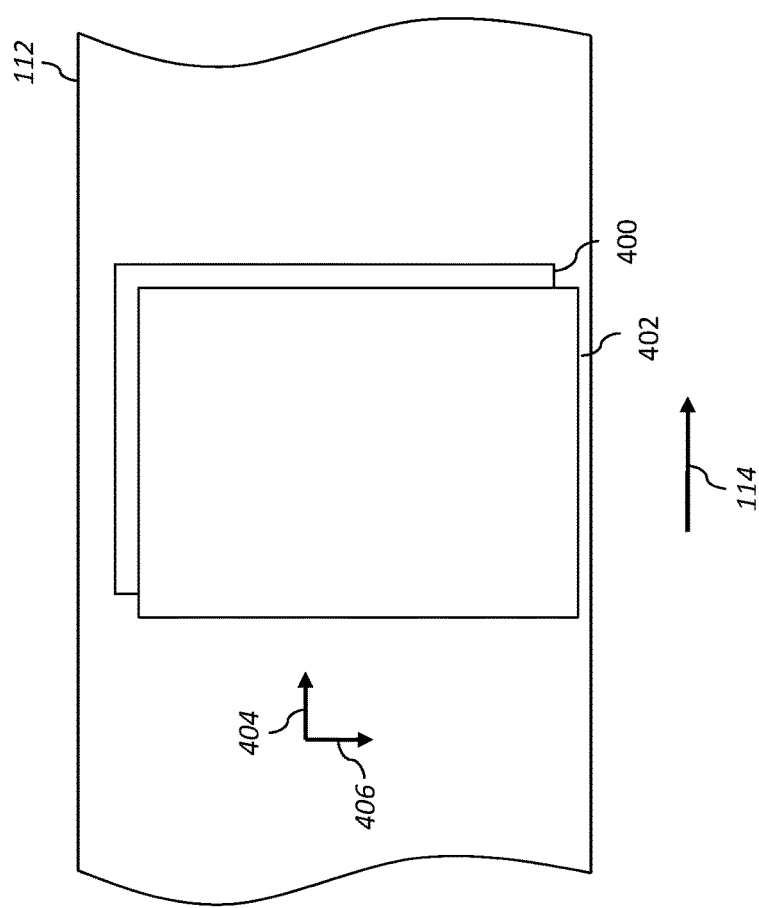
FIG. 4 illustrates a color registration error produced by the translation of one color plane relative to another color plane.

Translation is one type of color registration error. FIG. 4 depicts one example of cross-track and in-track color registration errors produced by the translation of one color plane relative to another color plane. Typically, one color plane (e.g., black) is used as a reference color plane 400 from which the color registration errors can be measured. In various embodiments, the reference color plane 400 can be the first color plane to be printed, the last color plane to be printed, or it can be printed at any other point in the sequence of printed color planes. Errors in registration for the remaining color planes can be determined by comparing each color plane to the reference color plane. In this example, the image content in color plane 402 is translated (i.e., shifted) with respect to the reference color plane 400. In the illustrated example, color plane 402 has color registration errors characterized by translations in both the in-track direction 404 and the cross-track direction 406.

Figure 5:
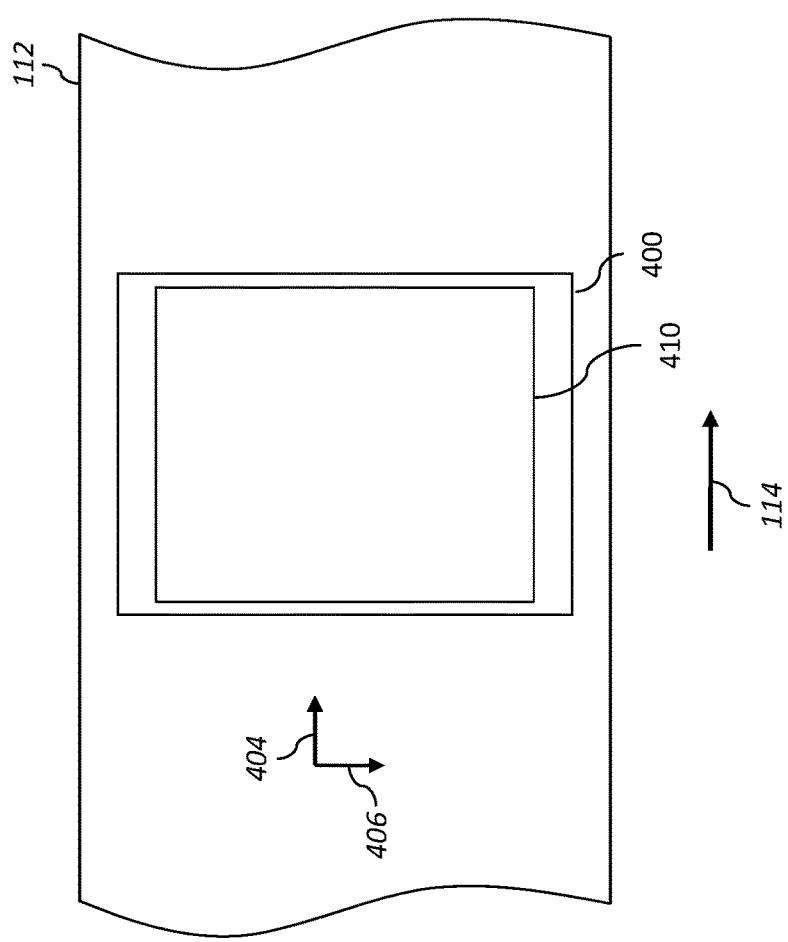
FIG. 5 illustrates a color registration error produced by the contraction or expansion of one color plane relative to another color plane.

Stretch and contraction represent another type of color registration error. FIG. 5 depicts an example color registration errors caused by the stretch or contraction of one color plane relative to another color plane. The different color planes can be stretched or contracted by different amounts in the in-track direction 404 and the cross-track direction 406. In this example, color plane 410 is contracted in both the in-track direction 404 and the cross-track direction 406 with respect to the reference color plane 400, with the contraction in the cross-track direction 406 having a larger magnitude.

Figure 6:
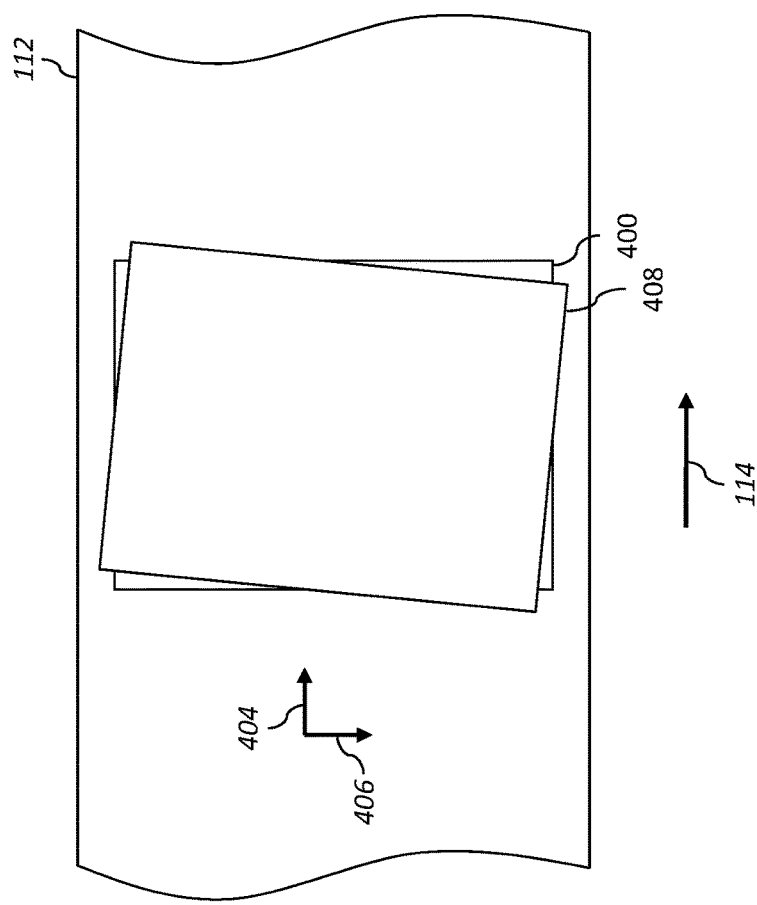
FIG. 6 illustrates a color registration error produced by the rotation of one color plane relative to another color plane.

Rotation or skew is another type of color registration error. FIG. 6 depicts an example of registration errors resulting from the rotation of one color plane relative to another color plane. In this example, the color plane 408 is rotated with respect to the reference color plane 400. Rotation errors result in registration errors in both the in-track direction 404 and the cross-track direction 406.

Stretching or shrinking can occur in the in-track direction 404, the cross-track direction 406, or both the in-track direction 404 and the cross-track direction 406. In some cases, one color plane can contract in one direction (e.g., the cross-track direction 406) and stretch in the other direction (e.g., the in-track direction 404). These shifts and distortions need not be uniform across the document. As a result, certain regions of a document may exhibit expansion while other regions may exhibit no expansion, or may even show contraction. In some cases, the registration errors can include combinations of the types of color registration errors shown in FIGS. 4-6, or can include different types of color registration errors.

As disclosed in commonly-assigned U.S. Pat. No. 9,094,643 (Armbruster et al.), entitled "Color-to-color correction in a printing system," which is incorporated herein by reference, it has been found that when printing multiple copies of a sequence of documents, the registration errors can vary widely from document to document within the sequence, but for any given document within the sequence, registration errors are generally consistent from one copy of the sequence of documents to the next. Armbruster et al. make use of this consistency to improve color-to-color registration. To provide good color-to-color registration the registration errors for each individual document within the repeated set are measured while the first copy of the repeated set is being printed. Registration corrections are then determined and applied to the color planes of each individual document of the repeated set when subsequent copies are printed based on the measured registration errors for the corresponding documents in the first copy. This can provide significant reductions in the registration errors for each copy after the initial copy.

In commonly assigned U.S. Pat. No. 9,010,900 (Armbruster et al.) entitled "Color-to-color correction in a printing system," which is incorporated herein by reference, Armbruster et al. extended the invention described in the aforementioned U.S. Pat. No. 9,094,643 (Armbruster et al.) by recognizing that small changes in the printed content of an individual document in a repeated set have little effect on the registration, provided that the changes in printed content don't significantly affect the amount and distribution of ink on the printed document. Accordingly, the same registration corrections can be applied to the sequence documents in the subsequent print jobs, even if the documents are slightly different than the corresponding documents in the first print job. This approach is well-suited for applications where the same basic print job may be printed repeatedly with only small changes, such as the name and address on a form letter to be distributed using a bulk mailing. Related inventions are described in commonly-assigned U.S. Pat. No. 9,016,822, U.S. Pat. No. 9,016,823, U.S. Pat. No. 9,033,445, and U.S. Pat. No. 9,016,824, (all to Armbruster et al.), each of which is incorporated herein by reference.

Each of these Armbruster et al. patents enable the reduction in periodic color registration errors. However, they all require knowing how long the repeated sequence of documents is within the print job. While this information may be available for some types of print jobs, it may not be in other cases. For example, a print job could consist of a PDF file for a book having a certain number of document pages, which is to be printed a specified number of times. In this case, the repeated sequence of documents would correspond to the number of document pages in the PDF file. With other print job submission methods, such as for print jobs provided using the Intelligent Printer Data Stream (IPDS) format or the Inkjet Printing Data Stream (IJPDS) format, information about the number of repeated document pages is not provided as part of the data stream.

Figure 7:
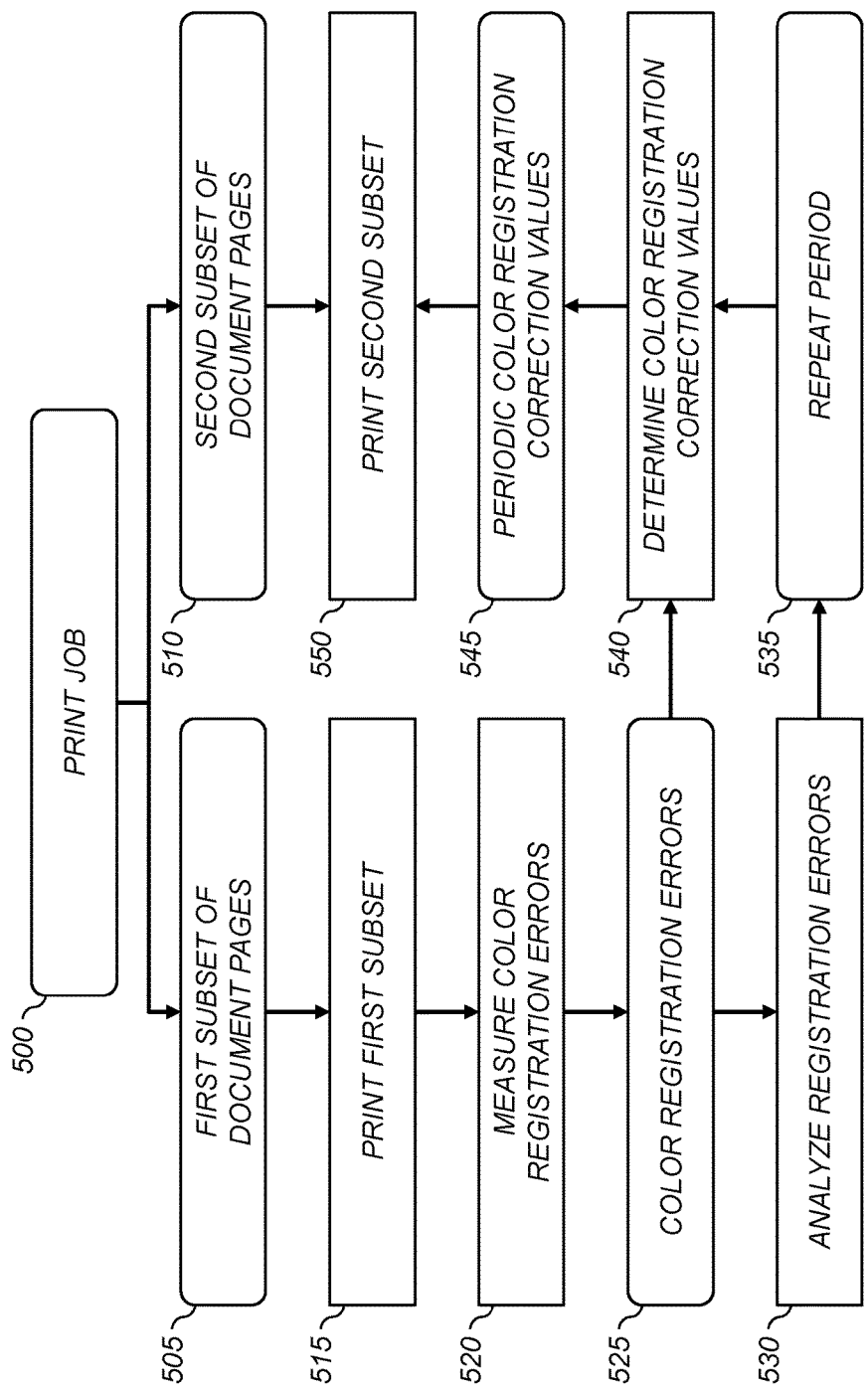
FIG. 7 illustrates a flow chart of a method for correcting color registration errors in accordance with an exemplary embodiment.

The present invention extends the registration methods described in the aforementioned Armbruster et al. patents by providing a method for determining the number of repeated document pages in a print job having periodic (or approximately periodic) content. FIG. 7 illustrates a flow chart of a method for correcting color registration errors for a print job 500 in accordance with an exemplary embodiment.

Two subsets of the document pages in print job 500 are formed: first subset of document pages 505 and second subset of document pages 510. The first subset of document pages 505 is used as a training set to detect and characterize a periodic pattern of color registration errors. The second subset of document pages 510 are then printed using color registration corrections determined based on the characterized registration errors. In some embodiments, the two subsets are mutually exclusive with the first subset of document pages 505 corresponding to a first portion of the document pages in the print job 500 (for example, the first 64 document pages), and the second subset of document pages 510 corresponding to the remaining document pages. The disadvantage of this approach is that the document pages that are contained in the first subset of document pages 505 can have substantial color registration errors that are not corrected.

In other embodiments, some of the document pages in the print job could be contained in both subsets. For example, the first subset of document pages 505 can correspond to a first portion of the document pages in the print job 500 (for example, the first 64 document pages). These document pages can be measured and used to characterize the color registration errors, then they can be discarded. The second subset of document pages 510 can then correspond to all of the document pages in the print job 500. This approach has the advantage that all of the document pages in the print job 500 can be printed using appropriate color registration corrections.

In accordance with an exemplary embodiment, the first subset of document pages 505 are printed using a print first subset step 515. Color registration errors in the printed document pages are then measured using a measure color registration errors step 520 to provide a sequence of color registration errors 525. Generally, the color registration errors 525 will be characterized at a sequence of different positions along the web of print medium 112 (FIG. 1). In some configurations, the color registration errors 525 can be determined by analyzing the content of the printed document pages. In other configurations, the color registration errors 525 can be measured by detecting the positions of registration marks printed adjacent to the printed document pages. For example, a set of registration marks can be printed at defined intervals along the left and right edges of the print medium 112. In an exemplary embodiment, registration marks are printed using each of the lineheads 106-1, 106-2, 106-3, 106-4 (FIG. 1) at eight evenly spaced positions down the length of each document page. The positions of each printed registration mark can then be detected using the quality control sensor 110 (FIG. 1). In some embodiments, color registration errors 525 for each color plane can be measured with respect to an absolute position on the print medium 112. In other embodiments, one of the color planes (e.g., the first color plane that is printed) can be specified to be a reference color plane, and the color registration errors for the other color planes can be determined based on a difference between the positions of the registration marks in the non-reference color planes and the positions of the corresponding registration marks printed in the reference color plane.

In an exemplary embodiment, the color registration errors 525 can be represented vector E of including a set of K different variables $E_k$ which characterize different aspects of the color registration errors 525. For example, the registration error variables $E_k$ can include color plane translation values in the cross-track and in-track directions (i.e., $\Delta x$, $\Delta y$) for each color plane to characterize the translation errors illustrated in FIG. 4. The registration error variables $E_k$ can also include color plane magnification values in the cross-track and in-track directions (i.e., $M_x$, $M_y$) for each color plane to characterize the stretch/contraction errors illustrated in FIG. 5 and color plane rotation values ($\theta$) for each color plane to characterize the rotation errors illustrated in FIG. 6. Other types of registration error variables $E_k$ can include image plane skew parameters. Preferably, the registration error variables are specified in such a way that they are independent of each other. The registration errors as a function of position within the document can then be estimated by combining the effects of each of the different registration error components.

The above examples of registration error variables are global in nature in that they specify registration errors across the entire document. In some embodiments, more complex color registration error functions can be used to characterize registration errors which may vary from one local region to another. For example, the registration error variables $E_k$ can specify the registration errors in terms of translations for a lattice of positions within the document. The registration errors for intermediate positions can then be estimated by using an interpolation process. This approach can be useful for cases where the image content in one portion of the image causes the print medium 112 to swell in a local region without affecting other portions of the print medium 112 which received a lower ink load.

Figure 8:
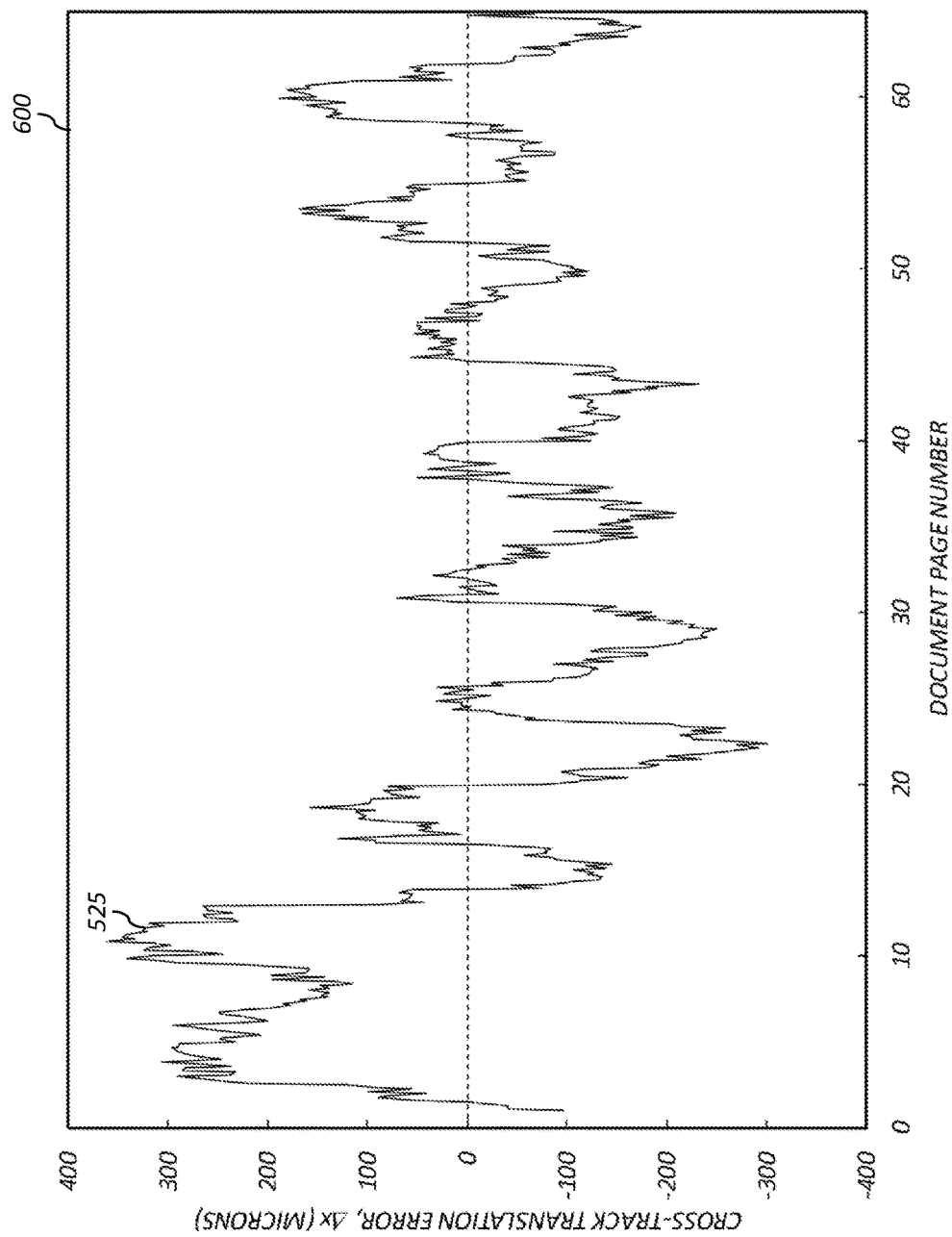
FIG. 8 is a graph illustrating measured color registration errors for an exemplary first subset of document pages.

FIG. 8 illustrates a registration error graph 600 showing a sequence of color registration errors 525 measured for an exemplary first subset of document pages 505 (FIG. 7) including 64 document pages. In the illustrated example, the registration error graph 600 plots a registration error variable corresponding to the cross-track translation errors, $\Delta x$, for one particular color plane. In this case, the cross-track translation errors are measured at a set of eight evenly spaced positions down the length of each document page. Analogous graphs could be made for other color planes and other registration error variables (e.g., in-track translation errors, $\Delta y$, cross-track magnification errors, $M_x$, and in-track magnification errors $M_y$).

Returning to a discussion of FIG. 7, an analyze registration errors step 530 is used to analyze the measured color registration errors 525 to determine whether it contains a periodic pattern, and if so to determine an associated repeat period 535. The analyze registration errors step 530 can use any method known in the art to analyze a signal in order to identify periodic content.

In one exemplary embodiment, the analyze registration errors step 530 employs Fourier analysis, typically using a Fast Fourier Transform (FFT), to detect periodicities in the measured color registration errors 525. The output of common FFT algorithms is typically in the form of a complex number value for each of a series of frequency bins. These complex number values can then be processed to determine the amplitude for each frequency bin. In some cases the amplitudes can be squared to provide a function known as a "periodogram." The frequency bins in the FFT analysis correspond to a series of discrete spatial frequency values, each frequency bin corresponding to particular fraction of a repeat cycle per sampling interval (i.e., the in-track distance between the positions where the color registration errors were measured). The spatial frequencies of each of the FFT frequency bins can then be inverted to determine corresponding spatial period values.

Figure 9:
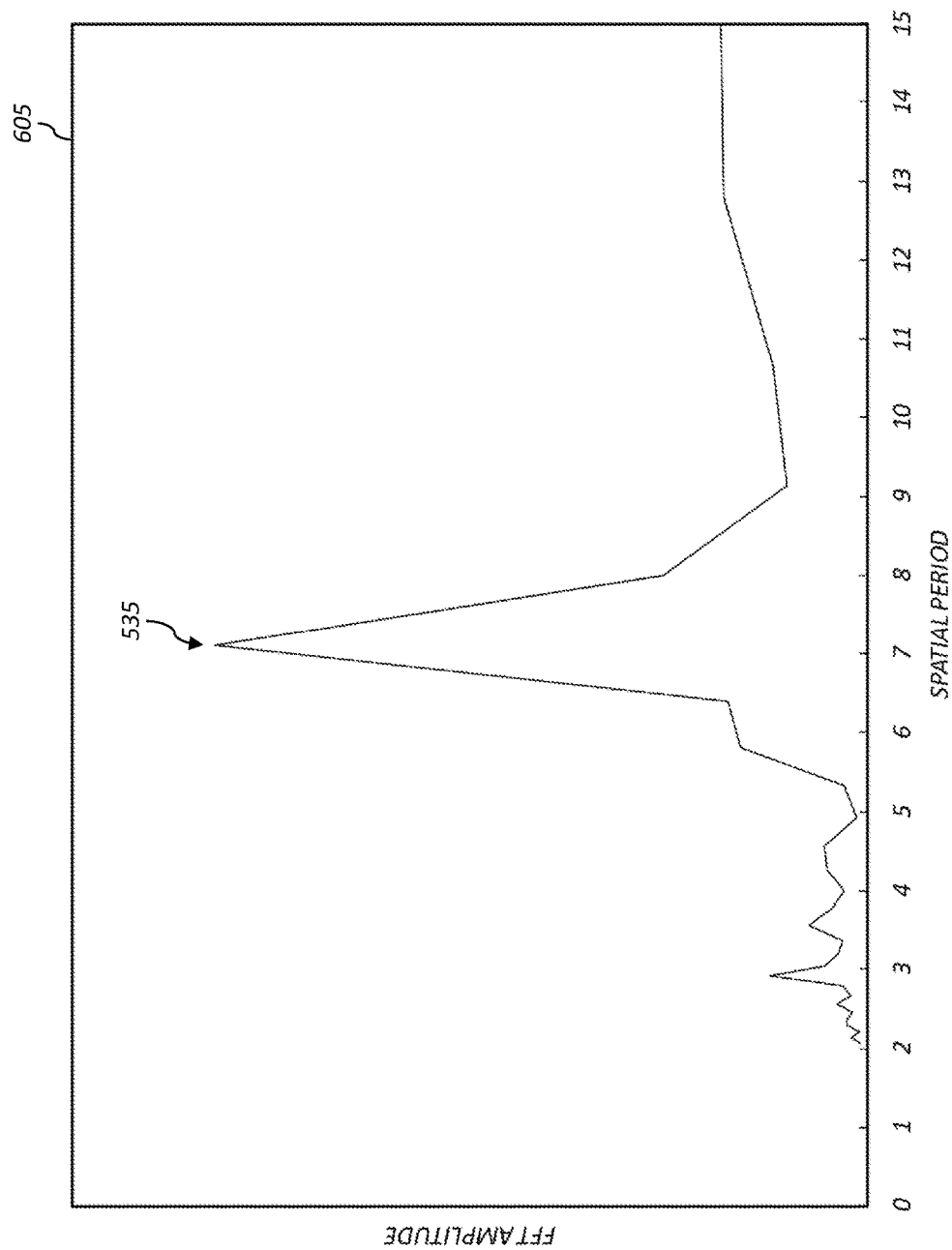
FIG. 9 is a graph showing a Fourier transform of the color registration errors of FIG. 8.

FIG. 9 shows an FFT amplitude graph 605 determined by applying an FFT to the color registration errors 525 shown in FIG. 8. The FFT amplitude graph 605 shows a clear peak indicating that the color registration errors 525 contain a periodic pattern having a dominant frequency corresponding to a repeat period 535 of seven document pages. Those skilled in the data analysis art will recognize that well-known algorithms exist to automatically identify the presence and location of a peak in the FFT amplitude graph 605 corresponding to the repeat period 535.

In order for the FFT analysis to be able to detect the repeat period, the data being analyzed must include a sufficient number of data points, so as to include multiple repeat periods and to provide a desired frequency resolution. The FFT used to provide the FFT amplitude graph 605 of FIG. 9 included 512 data points, corresponding to 64 pages with 8 data points per document page. In some implementations, the color registration errors 525 within each document page can be combined, through averaging or some other means, and the FFT analysis be carried out on the combined color registration errors. For example, the 8 data points measured for each document page can be averaged to provide an average color registration error.

In another exemplary embodiment, the analyze registration errors step 530 employs autocorrelation analysis to detect periodicities in the measured color registration errors 525. Autocorrelation analysis will be well-known to those skilled in the art and involves multiplying a signal by a shifted version of itself, and then summing the results. Some types of autocorrelation analyses are referred to in the art as "autocorrelograms." When the signal includes periodic content, the autocorrelation function determined using the autocorrelation analysis will have a peak at the lag (i.e., the amount of shift) corresponding to the period.

Figure 10:
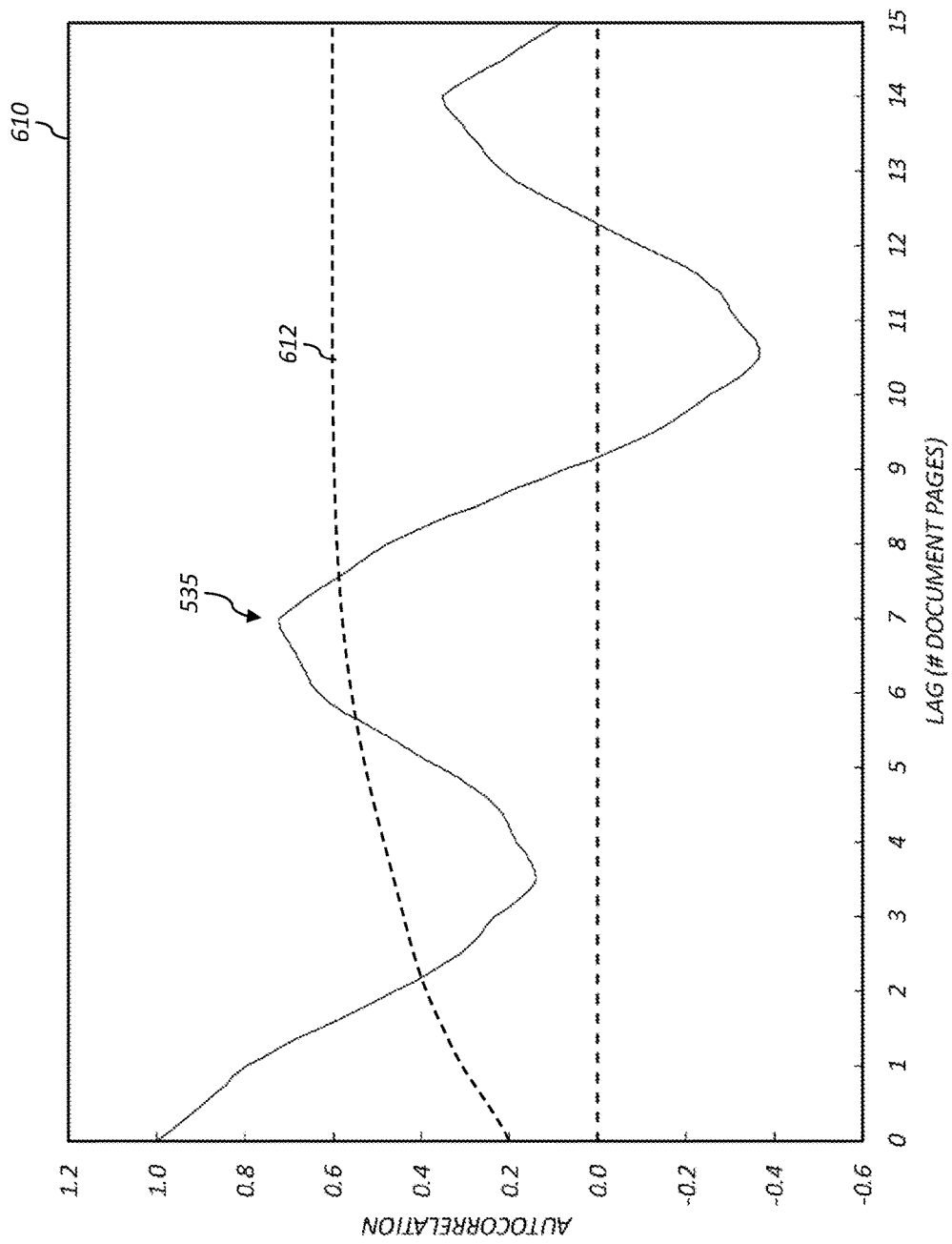
FIG. 10 is a graph showing an autocorrelation function determined for the color registration errors of FIG. 8.

FIG. 10 shows an autocorrelation graph 610 determined by computing the autocorrelation of the color registration errors shown in FIG. 8. It shows a clear peak indicating that the color registration errors 525 contain a periodic pattern having a repeat period 535 of seven document pages. The autocorrelation function will also have peaks at multiples of the repeat period 535 (e.g., at 14 document pages).

Those skilled in the data analysis art will recognize that well-known algorithms exist to automatically identify the presence and location of a peak in the autocorrelation graph 610 corresponding to the repeat period 535. When using autocorrelation analysis, it is common for the registration errors of each data point to be somewhat correlated to the registration error of the nearby data points. This produces the high correlation values for small lag values, with the correlation value dropping from that initial high level with increasing lag. These high correlation values at the small lag values do not provide an indication of document repeat period. The repeat period 535 will always be exhibited by a peak in the correlation values that is separated from these high correlation values at the lowest lag values.

Many autocorrelation analysis algorithms also produce a significance threshold curve 612 such as illustrated in FIG. 10. The autocorrelation data can be compared with the significance threshold curve 612 to determine whether any of the peaks rise above the significance threshold. If no peaks are found which rise above the significance threshold, then it can be concluded that the color registration errors 525 do not exhibit any significant periodic content.

As with the Fourier analysis, the autocorrelation analysis of the color registration errors 525 must include a sufficient number of data points, so as to include multiple repeat periods in order to be able to detect the correlations. With both the Fourier analysis and the autocorrelation analysis, increasing the number of data points to include a large number of document pages, adds more resolution to the analyses, enabling the peaks in the analysis output to rise above the background noise level to more clearly identify the correct document repeat period 535. However, this has to be balanced with the fact that no registrations corrections will be applied to the document pages in the first subset of document pages 505. As a result, the image quality will be lower for these document pages. While increasing the number of data points in the analysis can aid in detecting the repeat period 535, there is a desire to identify the repeat period 535 with the minimum number of data points so that the registration corrections can be implemented as quickly as possible. For print jobs 500 having repeat periods of less than about eight document pages with typical registration error magnitudes, it has been found that having 64 document pages in the first subset of document pages 505 is generally adequate to detect the repeat period 535.

Print jobs 500 having lower amplitudes of the periodic registration errors relative to the background noise would require more data points in order to be able to reliably resolve the repeat period 535. Because such print jobs 535 will also reap the least benefit from the registration corrections, the delay in identifying the repeat period may not be too detrimental to the overall print quality of the document pages printed without correction. For cases where it is found that the color registration errors 525 measured for the first subset of document pages 505 exceed a predefined image quality limit, it may be desirable to discard these pages after they are measured and reprint them using appropriate registration corrections.

The different types of registration errors (e.g., in-track and cross-track translation errors, in-track and cross-track magnification errors, and skew errors) for the different color planes can vary with respect to the magnitude of the periodic registration errors, and therefore the ability to identify a periodic registration error pattern can vary for the different types of registration errors and the different color planes. Such variations in the amplitude of the periodic registration error patterns can be related to the configuration of the printing system (e.g., the order and the spacing of the different printheads and dryers), and also to the ink coverage patterns for the different color planes. In some embodiments, the analysis to determine the repeat period 535 is performed on multiple types of registration errors and for multiple color planes. The results of these analyses can then be compared to provide a more robust determination of the repeat period 535. If certain registration error type/color plane combinations do not produce significant peaks in the FFT/autocorrelation functions, then these combinations can be excluded from the process of determining the repeat period 535. If the different registration error type/color plane combinations provide different estimates for the repeat period 535, then the smallest determined repeat period 535 can generally be used.

Figure 11:
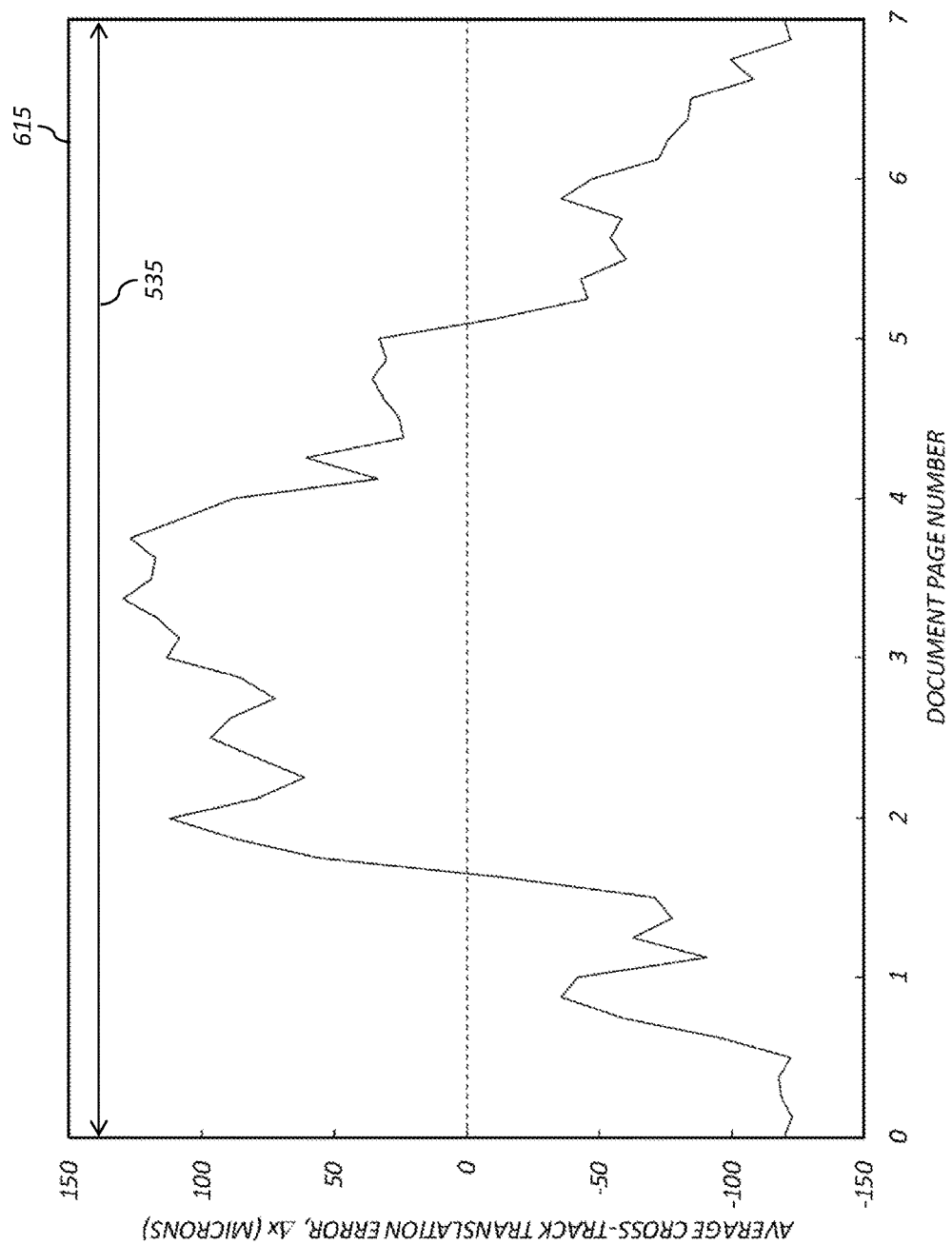
FIG. 11 is a graph illustrating periodic color registration errors determined for the color registration errors of FIG. 8.

Returning to a discussion of FIG. 7, once the repeat period 535 has been determined, a determine color registration correction values step 540 is used to determine a set of periodic color registration correction values 545. In an exemplary arrangement, the measured color registration errors 525 are divided into a series of repeat periods, and the color registration errors 525 for each of the repeat periods are averaged to determine an average color registration error as a function of position within the repeat period 535. FIG. 11 shows an average color registration error graph 615 showing the average color registration error as a function of relative position within the repeat period 535 determined by averaging the nine periods of color registration errors 525 in FIG. 8. In some implementations, low-frequency variations within the measured color registration errors 525 can be removed before the average color registration errors are calculated. For example, a low-pass filter can be applied to the signal to provide a "running average," and the low-pass filtered signal can be subtracted from the measured color registration errors 525. Those skilled in the art will recognize that other data processing techniques can be applied during the calculation of the average color registration error. For instance, in some implementations outlier tests can be applied to identify and remove any data for any repeat periods that are significantly different that the others before computing the average color registration errors. For example, in the measured color registration errors 525 of FIG. 8, the data for the first two repeat periods are somewhat different than the data for the next seven repeat periods, presumably due to the printing system 100 (FIG. 1) not reaching a steady state condition. In this case, the first two repeat periods could be excluded from the calculation of the average color registration errors.

Figure 12:
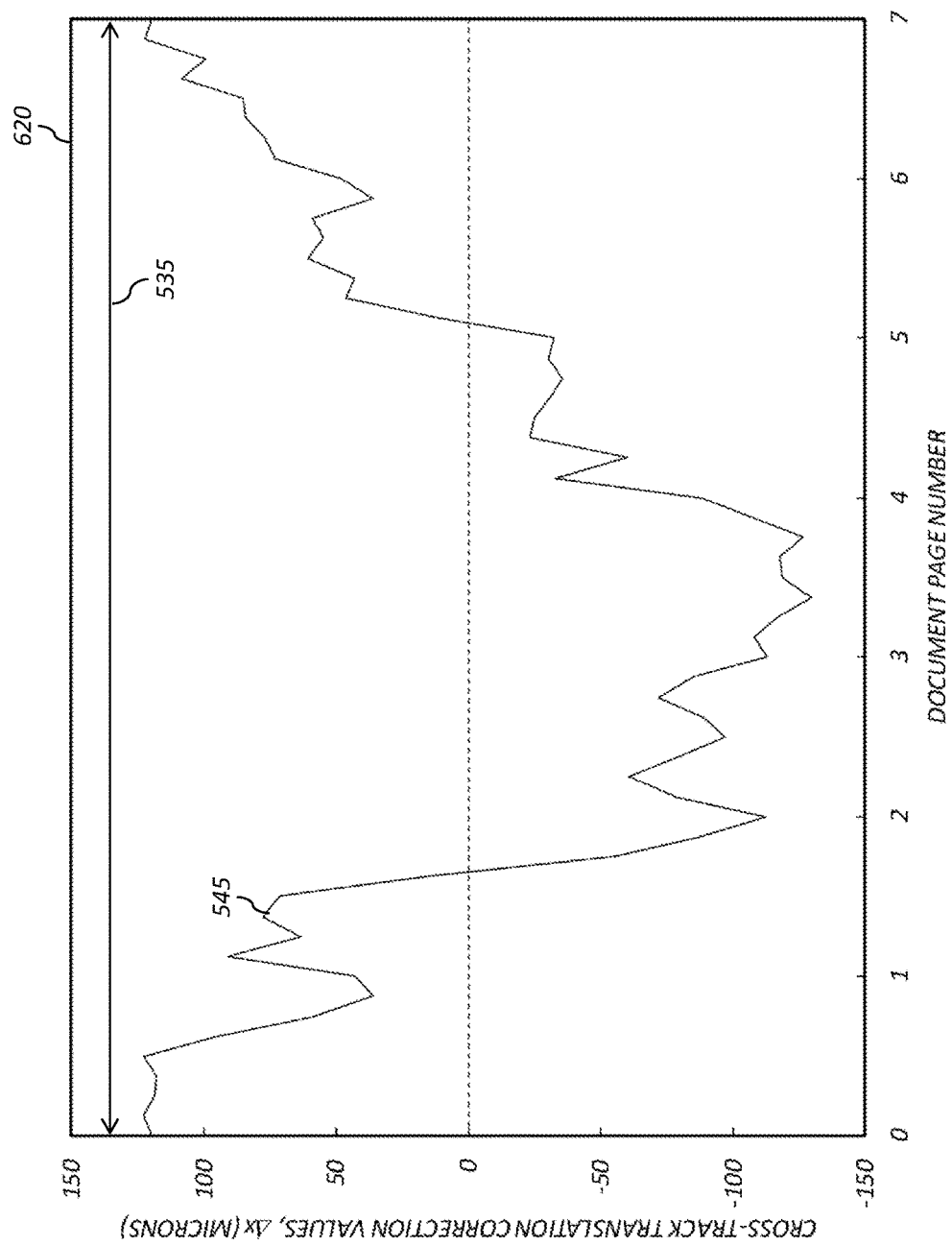
FIG. 12 is a graph illustrating a periodic pattern of color registration correction values corresponding to the periodic color registration errors of FIG. 11.

Once the average color registration errors are determined, appropriate periodic color registration correction values 545 are determined to compensate for these errors. For example, if the measured color registration errors 525 include in-track and cross-track translation errors for a particular color plane (i.e., $\Delta x$, $\Delta y$), the periodic color registration correction values 545 include corresponding in-track and cross-track shifts in the opposite direction (i.e., $\Delta x_c = -\Delta x$, $\Delta y_c = -\Delta y$). Similarly, if the measured color registration errors 525 include color plane magnification values in the in-track and cross-track directions (i.e., $M_x$, $M_y$), the periodic color registration correction values 545 can include compensating in-track and cross-track color magnification factors (i.e., $M_{xc} = 1/M_x$, $M_{yc} = 1/M_y$). Likewise, if the measured color registration errors 525 include color plane rotation values ($\theta$), the periodic color registration correction values 545 can include compensating rotations (i.e., $\theta_e = -\theta$). If the measured color registration errors 525 include more complex functions that describe the registration errors as a function of location within the document page, the periodic color registration correction values 545 can include parameters describing corresponding correction functions that compensate for the complex registration errors. FIG. 12 shows a color registration correction function graph 620 showing the periodic color registration correction values 545 to be applied for the repeat period 535 corresponding to the average color registration error graph 615 of FIG. 11.

In some implementations, the periodic color registration correction values 545 specify a single set of image plane corrections for each document page within the repeat period 535. In other implementations, the periodic color registration correction values 545 specifies image plane corrections for a plurality of regions within each document page. For example, the periodic color registration correction values 545 of FIG. 12 specify image plane corrections for eight different regions within each document page.

A print second subset step 550 is then used to print the second subset of document pages 510 using the periodic registration correction values 545. In general, a relative position of each document page within the repeat period 535 is determined, and appropriate color registration corrections are determined in accordance with the corresponding relative position within the periodic color registration correction values 545.

In some cases, the first document page of the second subset of document pages 510 may not correspond to the first document page of the periodic color registration correction values 545. In this case, a phase within the periodic color registration correction values 545 can be determined. The term "phase" is used in this context to refer to a relative position within the repeat period 535. For example, if the first subset of document pages 505 includes 64 document pages, then the first document page in the second subset of document pages 510 would be the 65th document page. If the repeat period 535 was found to be seven document pages, this would correspond to the 2nd document page within the repeat period (i.e., 65+(7×9)=2). Therefore the correction values applied for the first document page of the second subset of document pages 510 would correspond to the second document page within the periodic color registration correction values 545.

The print second subset step 550 can apply the periodic color registration correction values 545 to the document pages of the second subset of document pages 510 in a variety of different ways. In some embodiments, digital image data for each color plane of the document pages can be modified to incorporate the desired image plane corrections (e.g., in-track and cross-track color plane shifts, in-track and cross-track color plane magnification adjustments, and color plane rotations or skew adjustments). The modified digital image data can then be printed normally. In other embodiments, some or all of the image plane corrections can be applied by adjusting the image data as it is being printed, or by adjusting the printing process.

In some embodiments, the periodic color registration correction values 545 can be used to control a web-transport system that moves the continuous web of print medium 112 through the printing system 100 (FIG. 1). For example, the web-transport system can be controlled to steer the print medium 112, or adjust the speed that the print medium 112 moves through the printing system 100. For example, the print medium 112 can be steered using the media transport system described in commonly-assigned U.S. Patent Application Publication 2013/0113857 (Armbruster et al.), entitled "Media transport system including active media steering," which is incorporated herein by reference. This approach uses structures such as steered caster rollers to steer the web of media. In other embodiments, the print medium 112 can be steered using the media transport system described in commonly-assigned, U.S. Pat. No. 9,120,634, (Muir et al.), entitled "Media guiding system using Bernoulli force roller," which is incorporated herein by reference. This approach uses one or more media-guiding rollers having grooves formed around the exterior surface. An air source is controlled to provide an air flow into the grooves, thereby producing a Bernoulli force to draw the web of media into contact with the media-guiding rollers. An axis of the media-guiding rollers can be positioned to steer the web of media, or to perform other functions such providing a stretching force in the cross-track direction to prevent the formation of wrinkles.

In some embodiments, in-track color plane shifts can be applied by adjusting the timing at which lines of image data are printed using the printheads 200 (FIG. 2). For example, to shift the image forward along the print medium 112, the lines of image data can be printed at a slightly earlier time than they would be nominally, and to shift the image backward along the print medium 112, the lines of image data can be printed at a slightly later time than they would be nominally.

In some embodiments, cross-track color plane shifts can be applied by adjusting which inkjet nozzles are used to print the image data. For example, the image data supplied to the printheads can be shifted left or right to use different subsets of the nozzles in the printheads 200. In other embodiments, a servo-system can be used to adjust a cross-track position of the print medium 112 to apply the cross-track color plane shifts.

In some embodiments, cross-track magnification changes can be applied by using the methods described in commonly-assigned, U.S. Pat. No. 8,845,059, (Enge et al.), entitled: "Aligning print data using matching pixel patterns"; and commonly-assigned U.S. Pat. No. 8,760,712, (Enge et al.), entitled: "Modifying image data using matching pixel patterns", each of which is incorporated herein by reference. This method involves inserting or deleting image pixels across the width of the printhead 200 to adjust the size of the printed image in the cross-track direction 406.

In some embodiments, in-track magnification changes can be applied by adjusting the timing at which lines of image data are printed by the printheads 200. For example, to increase the in-track image size, the timing between the printing of successive lines of image data can be increased slightly, and to decrease the in-track image size, the timing between the printing of successive lines of image data can be decreased slightly.

Figure 13:
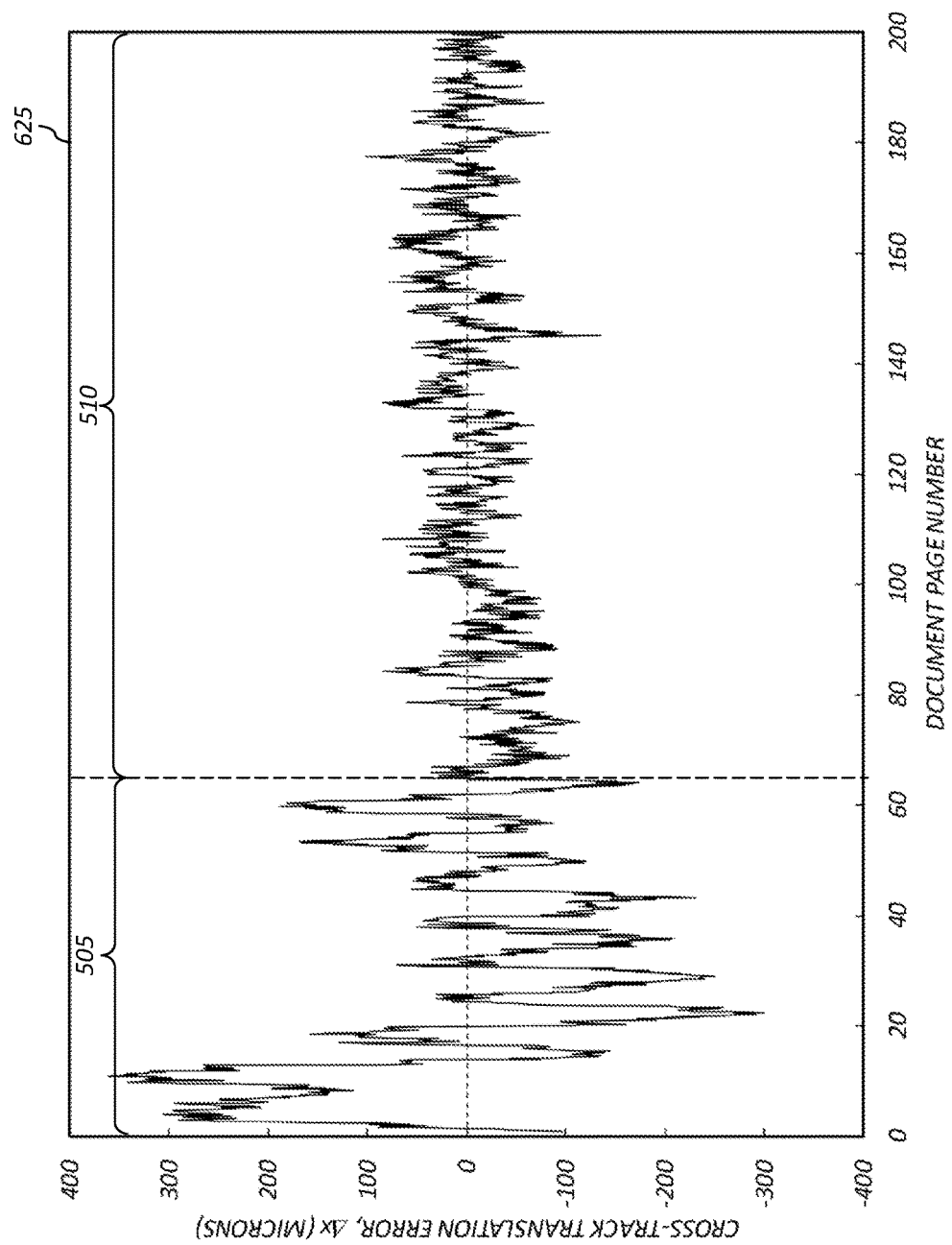
FIG. 13 is a graph illustrating reduced color registration errors provided in accordance with an exemplary embodiment.

FIG. 13 shows a registration error graph 625 of the cross-track translation error for the first 200 document pages of a print job 500 (FIG. 7) including about multiple copies of a document having seven document pages. The first subset of document pages 505 corresponds to that shown in FIG. 8. These document pages were printed without any registration correction. The document pages in the second subset of document pages 510 were printed using the registration corrections specified by the periodic color registration correction values 545 of FIG. 12 in accordance with the process of FIG. 7. It can be seen that the size of the average registration errors has been significantly reduced for the second subset of document pages 510. For this example, the RMS registration error for the first subset of document pages 505 was determined to be 145 microns, whereas the RMS registration error for the second subset of document pages 510 was determined to be 36 microns. This is approximately a 4× improvement in the registration errors.

In some embodiments, residual registration errors can be measured for the document pages printed by the print second subset step 550. This enables the system to monitor whether the determined periodic color registration correction values 545 are providing accurate compensation for the color registration errors. In some implementations, the residual registration errors are measured using the quality control sensor 110 (FIG. 1) to evaluate the positions of alignment marks printed in the margin of the printed document pages. In other implementations, the printed image data in the printed document pages can be analyzed as described in commonly-assigned U.S. Patent Application Publication No. 2015/0116734 (Howard et al.), entitled "Printer with image plane alignment correction," which is incorporated herein by reference. If it is determined that the measured residual registration errors are significant and consistent implying that there has been a change in the periodic pattern of color registration errors, the color registration of subsequently printed document pages can be adjusted accordingly. This can be accomplished by modifying the periodic color registration correction values 545 accordingly. For example, for the case where the residual registration errors are translation errors, an average of the residual registration errors can be computed over several repeat periods. The periodic color registration correction values 545 can then be modified by subtracting the average residual registration errors.

In some cases, there can be a change in the repeat period 535 part way through the print job 500. For example, if the print job includes a first set of documents having seven document pages, as well as a second set of documents having six document pages. If it is found that the residual registration errors are large and are not consistent from one repeat period 535 to the next, this could be an indication that the repeat period 535 is no longer valid. In this case, it may be desirable to print a new first subset of document pages 505 to determine a new repeat period 535 and a new set of periodic color registration correction values 545.

In some cases, the print job 500 (FIG. 7) can include documents having a dominant repeat period 535, but can include some documents having a different number of document pages. For example, if the print job 500 includes a set of bank statements, most of the bank statements may have seven document pages, but there may be an occasional bank statements that has more document pages (e.g., due to a large number of transactions). In this case, the periodic registration correction values 545 can get out of phase with the bank statements. This can be detected by analyzing the residual color registration errors. In some embodiments, if it is determined that the measured residual color registration errors exceed a predefined threshold, an analysis can be performed to determine whether the color registration errors would be reduced by adjusting a phase of the periodic registration correction values 545 (for example by shifting the phase forward or backward by one document page).

Figure 14:
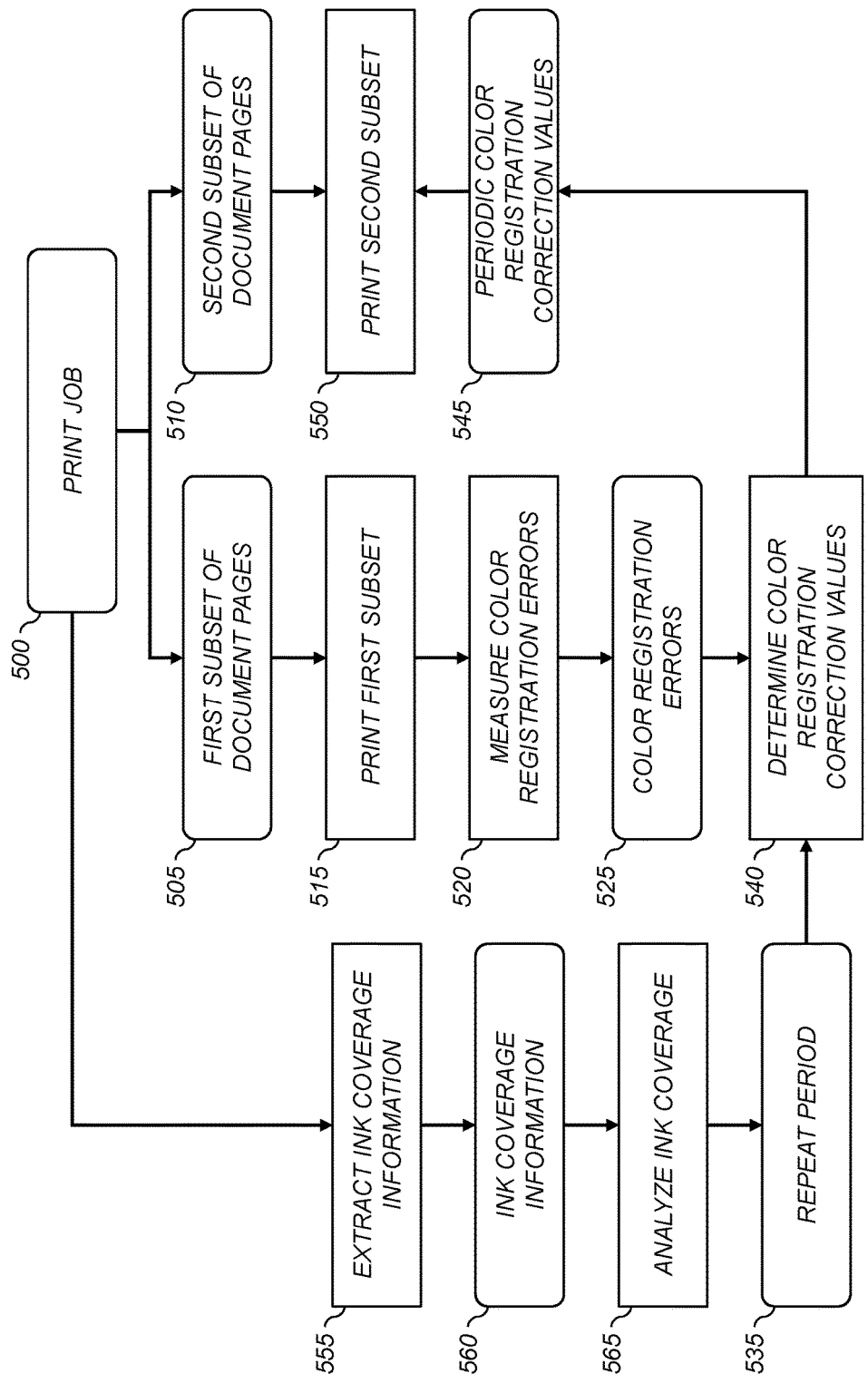
FIG. 14 illustrates a flow chart of a method for correcting color registration errors in accordance with an alternate embodiment.

As discussed earlier, the periodic pattern of registration errors produced when printing a print job 500 including multiple copies of a sequence of document pages are produced by variations in the ink coverage of the different documents in the print job. In the previously described embodiments, the repeat period 535 of the periodic pattern was determined by an analysis of a sequence of measured color registration errors 525. In alternate embodiments the repeat period 535 is determined by analysis of the ink coverage of the document pages in the print job 500. FIG. 14 illustrates a flow chart of a method for correcting color registration errors for a print job 500 in accordance with such an embodiment. Many of the steps of this process are analogous to those shown in FIG. 7, with the main difference being the manner in which the repeat period 535 is determined.

With the method shown in FIG. 14, an extract ink coverage information step 555 is used to extract ink coverage information by analyzing the image data for a set of document pages within the print job 500, and an analyze ink coverage step 565 is then used to determine the repeat period by analyzing the extracted ink coverage information. The image data for the document pages includes pixel values specifying a pattern of ink coverage to be printed for each of the color planes. In an exemplary configuration, the set of document pages that are analyzed include a predefined number of document pages (e.g., the first 64 document pages). In some embodiments, the extract ink coverage information step 555 is performed using a pixel counting function implemented in firmware in the raster image processor (RIP). While the document is being prepared for printing in the RIP, the total number of pixels to be printed for all layers together or for each individual layer can be determined and stored in the storage unit 118 (FIG. 1) of the control unit. This will produce a continuous record of ink laydown for each page printed.

In general, the color plane registration is primarily affected by the broad-scale ink coverage characteristics, and not the fine details of the ink coverage pattern. Therefore, in some embodiments, the extract ink coverage information step 555 can be performed on a low-resolution version of the image data. For example, the document pages of the print job 500 can be RIPed at a spatial resolution of 10 pixels/inch to provide the image data to be analyzed by the extract ink coverage information step 555, while the document pages might be RIPed at a spatial resolution of 600 pixels/inch for printing. In some implementations, the high-resolution image data to be used for printing can be processed to determine a low-resolution version that is used by the extract ink coverage information step 555.

Figure 15:
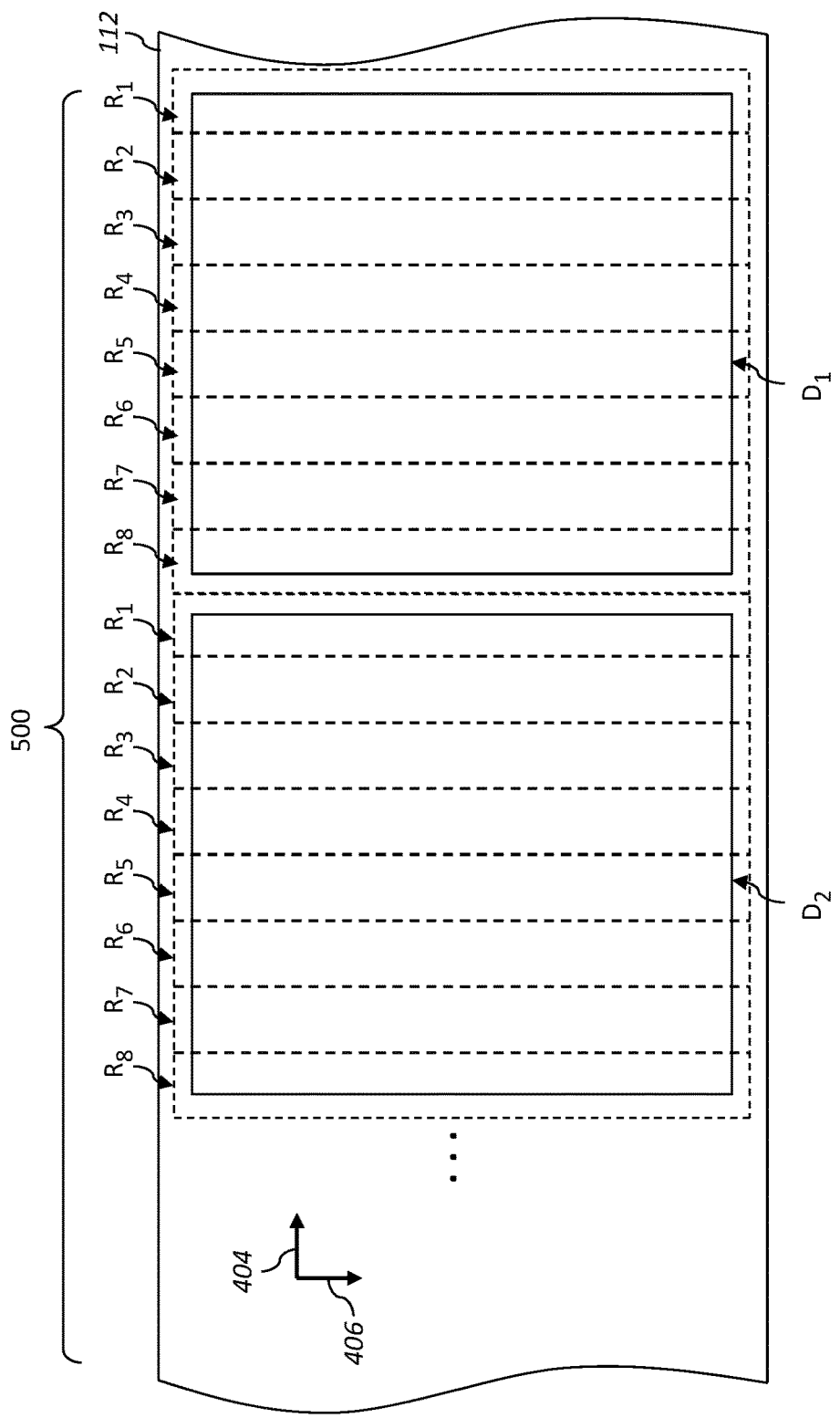
FIG. 15 illustrates the subdivision of document pages into a plurality of image regions.

In some embodiments, the ink coverage information 560 can be extracted from the set of document pages by computing integrated ink amounts (e.g., drop counts) for each of the document pages. In some implementations, one or more image regions are defined within each of the document pages, and the integrated ink amounts are computed for each of the image regions. For example, each document page ($D_1$, $D_2$, ... ) can be subdivided into eight image regions ($R_1$, $R_2$, ... $R_8$) along the in-track direction 404 as illustrated in FIG. 15. In other cases, the document pages can be subdivided in both the in-track direction 404 and the cross-track direction 406 to produce an array of image regions. The integrated ink amounts for each image region can then be determined by computing drop counts within each image region. In some cases, separate integrated ink amounts are determined for each of the color planes, while in other cases the integrated ink amounts are determined for one color plane (e.g., black), or by summing the ink amounts for all of the color planes.

Once the ink coverage information 560 has been extracted from the set of document pages, the analyze ink coverage step 565 proceeds to analyze the ink coverage information 560 to detect the presence of a periodic pattern and determine the associated repeat period 535. Any appropriate analysis technique known in the art can be used to determine the periodic pattern of ink coverage. For example, the Fourier transform analysis or the autocorrelation analysis described earlier with respect to the analyze registration errors step 530 of FIG. 7 can be applied in an analogous fashion to detect periodic patterns in the ink coverage information 560 and to determine the repeat period 535.

Determining the repeat period 535 by analyzing the ink coverage information 560 as specified by the pixels values of the document pages has an advantage relative to the method of FIG. 7 where the repeat period was determined by analyzing the color registration errors 525 in that the analysis of the ink coverage information 560 can be carried out prior to the printing of any documents. Furthermore, the measured color registration errors 520 tend to be noisier than the extracted ink coverage information 560. As a result, analysis of the color registration errors 520 requires more data points for the document repeat period data to be distinguished from the background noise than an analysis of the ink coverage information 560. The analysis examples have involved analysis of the total ink coverage of all the ink planes. The ink coverage analysis can however be carried out on one or more of the individual color planes rather than one the total ink coverage.

Once the repeat period 535 of the periodic pattern of ink coverage has been determined, a print first subset step 515 is used to print a first subset of document pages 505 using the printing system 100 (FIG. 1), wherein the first subset of document pages 505 includes at least one repeat period 535. In this case, since the repeat period 535 is already known, the first subset of document pages 505 can generally include a much smaller number of document pages than was needed for the method of FIG. 7, which represents another advantage of the FIG. 14 method. In some cases, the first subset of document pages 505 can include a single repeat period 535 of document pages. In other cases, the first subset of document pages 505 can include a plurality of repeat periods 535 (e.g., between 2 to 5 repeat periods 535) in order to provide redundant measurements of the color registration errors 525. This enables the determine color registration correction values step 540 to average the measured color registration errors across several repeat periods 535 (as discussed earlier with respect to FIG. 7), thereby reducing the impact of measurement noise on the determined periodic color registration correction values 545.

Once the periodic color registration correction values 545 are determined, a print second subset step 550 is used to print a second subset of document pages 510 using the determined periodic color registration correction values 545, thereby reducing the color registration errors in the printed documents.

As was discussed previously, U.S. Pat. No. 9,010,900 disclosed that the documents in the sequence of document pages do not have to match perfectly from one repeat period 545 to the next in order to gain a benefit from applying periodic color registration corrections. Small changes in the printed content of an individual document page (such as the name and address on a form letter to be distributed using a bulk mailing) in a repeated set of document pages will have little effect on the color registration, provided that the changes in printed content does not significantly affect the amount and distribution of ink on the printed document page. Accordingly, the same periodic color registration correction values 545 can be applied to the sequence of document pages, even if the content of the document pages is slightly different than the corresponding document pages that were analyzed to determine the periodic color registration correction values 545. In general, the analysis of the ink coverage information 560 to determine the repeat period 535 as outlined above will also be insensitive to any small changes in the printed content of the individual document pages.

In some embodiments, an analysis of the ink coverage of the document pages in the second set of document pages 510 can be performed in order to identify deviations from the expected periodic pattern of ink coverage. In this case, a set of reference ink coverage information can be determined corresponding to a nominal repeat period and stored in storage 120 (FIG. 1). For example, the reference ink coverage information can be extracted from the first set of document pages 505 that were used to determine the periodic color registration correction values. Ink coverage information can then be extracted from the document pages in each repeat period of the second subset of document pages 510 for comparison with the reference ink coverage information in order to determine whether there are any significant difference in the ink coverage. For example, the ink coverage information for each of the document pages in the repeat period can be subtracted from the reference ink overage information for the corresponding document pages. If the ink coverages exactly match, then the result of the subtraction for each document page will yield zero. Even if the ink coverages do not match perfectly from one repeat period to the next, the differences will tend to be small so that the result of this subtraction will be close to zero. If however there is a significant deviation in the ink coverage pattern from the reference ink coverage information, the computed differences will be larger, providing an indication that it may not be appropriate to apply the periodic color registration correction values. In some embodiments, rather than comparing the ink coverage information for a repeat period to a set of reference ink coverage information, it can be compared to the ink coverage information for the previous repeat period.

If significant difference in the ink coverage characteristics are detected, a number of different actions can be take. For example, in some cases, if it is found that the differences in the ink coverage characteristics exceed some predefined threshold, the new ink coverage characteristics can be analyzed together with color registration errors for a set of corresponding printed document pages to determine appropriate adjustments that can be made to the periodic color registration correction values 545.

In some cases, the differences in the ink coverage characteristics may result from there being a different number of document pages in a particular document. For example, if the print job 500 includes a set of bank statements, most of the bank statements may have seven document pages, but there may be an occasional bank statements that has more document pages (e.g., due to a large number of transactions). In this case, the periodic ink coverage can get out of phase. This can be detected by analyzing the ink coverage information to determine whether adjusting the phase (for example by shifting the phase forward or backward by one document page) reduces the differences in the ink coverage. If such phase shifts are detected, then the same phase shifts can be applied to the periodic color registration correction values in order to make more appropriate registration corrections for the document pages.

In some cases, it may be found that there is a significant change in the ink coverage characteristics that starts part way through the print job 500 that cannot be attributed to a simple phase change. In this case, the process of FIG. 14 can be restarted (for example, using the most recently printed set of 64 document pages) to determine a new repeat period 535, and a new set of periodic color registration correction values 545 that are appropriate for the new ink coverage characteristics.

The invention has been described in detail with particular reference to certain preferred embodiments thereof, but it will be understood that variations and modifications can be effected within the spirit and scope of the invention.

PARTS LIST 100 printing system
102 print module
104 print module
106-1 linehead
106-2 linehead
106-3 linehead
106-4 linehead
108 dryer
110 quality control sensor
111 web tension system
112 print medium
114 transport direction
116 turnover module
118 processing system
120 storage system
200 printhead
202 nozzle array
204 support structure
206 heat
300 print job
302 page
304 page 306 page
308 page
310 page
312 page
314 page
316 page
400 reference color plane
402 color plane
404 in-track direction
406 cross-track direction
408 color plane
410 color plane
500 print job
505 first subset of document pages
510 second subset of document pages
515 print first subset step
520 measure color registration errors step
525 color registration errors
530 analyze registration errors step
535 repeat period
540 determine color registration correction values step
545 periodic color registration correction values
550 print second subset step
555 extract ink coverage information step
560 ink coverage information
565 analyze ink coverage step
600 registration error graph
605 FFT amplitude graph
610 autocorrelation graph
612 significance threshold curve
615 average color registration error graph
620 color registration correction function graph
625 registration error graph
$D_1$ document page
$D_2$ document page
$D_3$ document page
$D_N$ document page
$R_1$ image region
$R_2$ image region
$R_3$ image region
$R_4$ image region
$R_5$ image region
$R_6$ image region
$R_7$ image region
$R_8$ image region

The invention claimed is:

1. A method for correcting color registration errors while printing a print job on a print media using a color printer, the print job including a plurality of document pages having pixel values for a plurality of color planes, comprising:
using the color printer to print a first subset of the document pages using the color printer;
measuring color registration errors for the printed first subset of document pages;
analyzing the measured color registration errors to determine a periodic pattern of color registration errors having a repeat period;
determining a repeating pattern of color registration correction values corresponding to the periodic pattern of color registration errors, wherein the color registration correction values specify image plane corrections for at least one of the color planes; and
using the color printer to print a second subset of the document pages using the determined repeating pattern of color registration correction values.

2. The method of claim 1, wherein analyzing the measured color registration errors includes performing Fourier analysis as part of a process for determining the repeat period.

3. The method of claim 1, wherein analyzing the measured color registration errors includes performing autocorrelation analysis as part of a process for determining the repeat period.

4. The method of claim 1, wherein analyzing the measured color registration errors includes determining a phase for the repeating pattern of color registration correction values for the first document page of the second subset of the document pages.

5. The method of claim 1, wherein the determination of pattern of color registration correction values includes:
determining a pattern of color registration errors by averaging the measured color registration errors across a plurality of repeat periods; and
determining the repeating pattern of color registration correction values that is appropriate to correct for the pattern of color registration errors.

6. The method of claim 1, wherein the repeating pattern of color registration correction values specifies image plane corrections for each document page in the repeat period.

7. The method of claim 6, wherein image plane corrections specified for each document page include different image plane corrections for a plurality of regions with the document page.

8. The method of claim 1, further including:
measuring residual color registration errors for at least some of the document pages in the printed second subset of document pages;
analyzing the measured residual color registration errors to detect a change in the periodic pattern of color registration errors; and
determining a modified repeating pattern of color registration correction values corresponding to the detected change in the periodic pattern of color registration errors.

9. The method of claim 8, wherein the repeating pattern of color registration correction values are modified by subtracting the residual color registration errors.

10. The method of claim 8, wherein the detected change in the periodic pattern of color registration errors includes a change in the repeat period.

11. The method of claim 1, further including:
measuring residual color registration errors for at least some of the document pages in the printed second subset of document pages; and
adjusting a phase of the repeating pattern of color registration correction values when it is determined that the measured residual color registration errors exceed a predefined threshold.

12. The method of claim 1, wherein the repeating pattern of color registration correction values include in-track shift values, cross-track shift values, in-track magnification factors, cross-track magnification factors, or image rotation values.

* * * * *